(12) United States Patent
Ohnishi

(10) Patent No.: US 8,948,775 B2
(45) Date of Patent: Feb. 3, 2015

(54) MOBILE COMMUNICATION SYSTEM, CONSTITUENT APPARATUSES THEREOF, TRAFFIC LEVELING METHOD AND PROGRAM

(75) Inventor: Masato Ohnishi, Tokyo (JP)

(73) Assignee: NEC Corporation, Tokyo (JP)

( * ) Notice: Subject to any disclaimer, the term of this patent is extended or adjusted under 35 U.S.C. 154(b) by 206 days.

(21) Appl. No.: 13/516,164

(22) PCT Filed: Dec. 17, 2010

(86) PCT No.: PCT/JP2010/072745
§ 371 (c)(1),
(2), (4) Date: Jun. 14, 2012

(87) PCT Pub. No.: WO2011/074659
PCT Pub. Date: Jun. 23, 2011

(65) Prior Publication Data
US 2012/0252458 A1    Oct. 4, 2012

(30) Foreign Application Priority Data

Dec. 18, 2009  (JP) .................................. 2009-287190

(51) Int. Cl.
*H04W 28/08* (2009.01)
*H04L 12/803* (2013.01)
(Continued)

(52) U.S. Cl.
CPC ............ *H04L 47/122* (2013.01); *H04L 43/062* (2013.01); *H04L 43/0882* (2013.01); *H04L 43/026* (2013.01); *H04W 28/0247* (2013.01)
USPC ........ 455/453; 455/436; 455/423; 455/67.11; 370/229; 370/230; 370/230.1

(58) Field of Classification Search
CPC ..... H04W 28/08; H04W 16/08; H04W 72/00; H04W 36/22
USPC ............... 455/453, 423, 67.11, 436; 370/229, 370/230, 230.1
See application file for complete search history.

(56) References Cited

U.S. PATENT DOCUMENTS 8,064,342 B2 * 11/2011 Badger .......................... 370/230
8,346,275 B2 * 1/2013 Ogura ............................ 455/453
(Continued)

FOREIGN PATENT DOCUMENTS

CN     1836169 A       9/2006
JP     2001-69176 A    3/2001
(Continued)

OTHER PUBLICATIONS

Nick McKeown et al., OpenFlow: Enabling Innovation in Campus Networks, Internet <URL: http://www.openflowswitch.org//documents/openflow-wp-latest.pdf>, Mar. 2008, 6 pages.
(Continued)

*Primary Examiner* — Kashif Siddiqui
*Assistant Examiner* — Farideh Madani
(74) *Attorney, Agent, or Firm* — Foley & Lardner LLP

(57) ABSTRACT

A mobile communication system includes a traffic monitoring apparatus arranged between predetermined nodes in a mobile network for monitoring a traffic amount between the nodes; and a traffic control apparatus that outputs control information to the predetermined nodes based on a report from the traffic monitoring apparatus wherein the control information instructs the predetermined nodes to level the traffic amount.

17 Claims, 15 Drawing Sheets

(51) Int. Cl.
*H04L 12/26* (2006.01)
*H04W 28/02* (2009.01)

(56) References Cited

U.S. PATENT DOCUMENTS

| | | | | |
|---|---|---|---|---|
| 2004/0152469 | A1* | 8/2004 | Yla-Outinen et al. | 455/453 |
| 2010/0246417 | A1* | 9/2010 | Cheng et al. | 370/252 |

FOREIGN PATENT DOCUMENTS

| | | |
|---|---|---|
| JP | 2002-261925 A | 9/2002 |
| JP | 2003-51845 A | 2/2003 |
| JP | 2003-111133 A | 4/2003 |
| JP | 2003-298631 A | 10/2003 |
| JP | 2004343807 A | 12/2004 |
| JP | 2005-31822 A | 11/2005 |
| JP | 2006-54652 A | 2/2006 |
| JP | 2008-236037 A | 10/2008 |
| JP | 2008259046 A | 10/2008 |

OTHER PUBLICATIONS

OpenFlow Switch Specification, Version 0.9.0 (Wire Protocol 0x98), Internet <URL: http://www.openflowswitch.org/documents/openflow-spec-v0.9.0.pdf>, Jul. 2009, pp. 1-36.

Office Action mailed May 5, 2014 in related Chinese Application No. 201080057900 with partial English-language translation (12 pgs.).

Office Action mailed Aug. 26, 2014 in related Japanese application No. 2011-546177 with partial English-language translation (4 pgs.).

* cited by examiner

MOBILE COMMUNICATION SYSTEM, CONSTITUENT APPARATUSES THEREOF, TRAFFIC LEVELING METHOD AND PROGRAM

CROSS-REFERENCE TO RELATED APPLICATIONS

This application is the National Phase of PCT/JP2010/072745, filed Dec. 17, 2010, and claims the benefit of the priority of Japanese patent application No. 2009-287190, filed on Dec. 18, 2009, the disclosures of which are incorporated herein in their entirety by reference thereto.

The present invention relates to a mobile communication system, constituent apparatuses thereof, a traffic leveling method, and a computer program, and more particularly to a mobile communication system having the traffic amount monitoring function, constituent apparatuses thereof, a traffic leveling method, and a computer program.

BACKGROUND

Patent Document 1 discloses a configuration in which, when mobile stations are unevenly distributed, base stations and a higher-level control station work together to adjust the coverage area of the base stations to reduce the state in which communication cannot be performed. In this configuration, each of the base stations collects information on the number of mobile stations, as well as the state of the mobile stations (busy, reception standby, power-off after location registration), in the service area of the base station, and the higher-level control station receives communication traffic information from the base stations, identifies the limit of the traffic density and, based on the information, supplies control information for adjusting the communication support range (coverage area) of the base stations.

Patent Document 2 discloses a configuration in which a management system is provided. When a change in the load status is notified from an IPGW (Internet Protocol GateWay) that has the load measurement unit for measuring the number accesses to the IPGW and the load of the CPU, the management system issues an instruction to the mobile subscriber center (MSC) to allow a mobile terminal to access, not a near IPGW, but a lightly loaded IPGW.

Patent Document 3 discloses a radio network system that has a node selection information management function unit connected, directly or indirectly, to all of multiple base control stations and multiple base stations. This node selection information management function unit acquires traffic load information on all base control stations and transmits information on call connection destination priority, which is best for the entire network system, to each base station.

Non Patent Document 1 proposes a technology called OpenFlow. OpenFlow identifies communications as end-to-end flows and performs path control, failure recovery, load balancing, and optimization on a per-flow basis. An OpenFlow switch, which functions as a forwarding node, operates according to the flow table to which information is added, and whose contents are updated, by the OpenFlow controller according to the OpenFlow protocol. The flow table includes flow entries each of which is a set of a packet matching rule, which identifies a packet, and an action for outputting a packet to a particular port, discarding a packet, or rewriting the header of a packet. When a matching entry is found, the OpenFlow switch performs processing for the received packet according to the action described in the entry. When a matching entry is not found, the OpenFlow switch notifies the OpenFlow protocol that a packet has been received.

Non Patent Document 2 is a specification prepared by the OpenFlow Consortium. The detail of the functions of the counters provided by the OpenFlow switch is described in "3.2 Counters" on page 4 of the specification. The function of the OpenFlow controller to collect statistical information, recorded by the counter function described above, from the OpenFlow switches is described in "4.1.1 Controller-to-Switch" on page 9 of the specification (see the item "Read-State").

Patent Document 1:
Japanese Patent Kokai Publication No. JP2003-111133A
Patent Document 2:
Japanese Patent Kokai Publication No. JP2001-069176A
Patent Document 3:
Japanese Patent Kokai Publication No. JP2008-236037A
Non Patent Document 1:
Nick McKeown and seven other authors, "OpenFlow: Enabling Innovation in Campus Networks", [online], [Searched on Jul. 17, 2009], Internet <URL: http://www.openflowswitch.org//documents/openflow-wp-latest.pdf>
Non Patent Document 2:
OpenFlow Switch Specification" Version 0.9.0. (Wire Protocol 0x98) [Searched on Dec. 7, 2009], Internet <URL: http://www.openflowswitch.org/documents/openflow-spec-v0.9.0.pdf>

SUMMARY

The disclosure of Patent Documents 1-3 given above and Non Patent Documents 1 and 2 are hereby incorporated in their entirety by reference into this specification.

The following analysis is given by the present invention.

For the node selection method for processing calls in a mobile network, a mechanism for load balancing according to the number of calls (number of sessions) is known. For example, in LTE (Long Term Evolution), MME (Mobility Management Entity) can select an S-GW (Serving Gateway) for establishing a U-Plane (user plane) path connection while considering the number of sessions in connection and, in addition, can control QoS (Quality of Service), such as the minimum guaranteed communication bandwidth or the maximum communication bandwidth, for a connected session.

From the viewpoint of network redundancy, redundancy may be added to a core node, which performs location registration, by the Iu-Flex function between the RNC (Radio Network Controller) and the SGSN (Serving GPRS Support Node)/MSC (Mobile Switch Center) in a UTRAN (UMTS Terrestrial Radio Access Network)/CS (Circuit Switched)•PS (Packed Switched) domain or by the S1-Flex function in an LTE/EPC (Evolved Packet Core) network. "S1" is an interface between a mobile network node and a base station (eNB), and "S1-Flex" is its redundant configuration. The specification for both S1 and S1-Flex is developed by 3GPP (3rd Generation Partnership Project). "Iu-Flex" is the interface employed by a mobile communication system before the "S1-Flex" based LTE system is introduced.

However, traffic is not taken into consideration when selecting a node for processing a call in a mobile network. This prevents leveled node selection from being carried out from the viewpoint of the communication bandwidth, thus generating the problem that the communication bandwidth will sometimes become insufficient among the nodes in the mobile network. For example, in LTE, the MME selects an S-GW for each tracking area (TA), composed of multiple cells, to distribute the load, sometimes with the possibility that the bandwidth becomes insufficient between nodes. Therefore, to ensure the minimally guaranteed communication bandwidth under QoS control, a mobile network needs to reserve an extra data communication bandwidth (network node) to prevent communication bandwidth insufficiency from occurring between nodes.

FIG. 15 is a diagram showing the points where a bottleneck may be produced in a mobile network. Point A is the communication bandwidth of a P-GW (PDN GateWay) for communication with a PDN (Packet Data Network), point 13 is the communication bandwidth of a P-GW for communication with an S-GW, point C is the communication bandwidth of an S-GW for communication with a P-GW, point D is the communication bandwidth of an S-GW for communication with an eNB (evolved NodeB), and point E is the communication bandwidth of an eNB for communication with an S-GW. Note that the technology called SON(Self Organizing Network) is proposed separately as a technology for reserving the communication bandwidth of an eNB for communication with a terminal.

Patent Document 1 describes that the communication support range is adjusted based on the communication traffic information. Note that "traffic information" as described in Patent Document 1 is the information produced by multiplying the number of mobile stations in each state, such as the one represented by expression (1) in the specification, by a predetermined coefficient, but not the information obtained by measuring the actual traffic. The technology disclosed in Patent Documents 2 and 3 also measure the number of accesses to the IPGW and the load of the CPU, but do not measure the amount of data that actually flows.

It is an object of the present invention to provide a mobile communication system, constituent apparatuses thereof, a traffic leveling method, and a program for leveling the traffic in a mobile communication network.
Thus, there is much to be desired in the art.

According to a first aspect of the present invention, there is provided a mobile communication system, including a plurality of traffic monitoring apparatus each arranged between predetermined nodes in a mobile network for monitoring a traffic amount between the nodes; and a traffic control apparatus that outputs control information to the predetermined nodes based on a report from the traffic monitoring apparatus, the control information instructing the predetermined nodes to level the traffic amount.

According to a second aspect of the present invention, there is provided a traffic control apparatus connected to a traffic monitoring apparatus, the traffic monitoring apparatus arranged between predetermined nodes in a mobile network for monitoring a traffic amount between the nodes, wherein the traffic control apparatus outputs control information to the predetermined nodes based on a report from the traffic monitoring apparatus, the control information instructing the predetermined nodes to level the traffic amount.

According to a third aspect of the present invention, there is provided a traffic monitoring apparatus that is arranged between predetermined nodes in a mobile network for monitoring a traffic amount between the nodes and reports the monitored traffic amount to the traffic control apparatus described above.

According to a fourth aspect of the present invention, there is provided an MME (Mobility Management Entity) and an access node that perform a traffic leveling operation based on the control information received from the traffic control apparatus described above.

According to a fifth aspect of the present invention, there is provided a traffic leveling method comprising monitoring a traffic amount between nodes using a traffic monitoring apparatus arranged between predetermined nodes in a mobile network; and outputting, by a traffic control apparatus, control information to the predetermined nodes based on a report received from the traffic monitoring apparatus, the control information instructing the predetermined nodes to level the traffic amount. This method is associated with a particular machine called a traffic control apparatus.

According to a sixth aspect of the present invention, there is provided a computer program causing a computer to perform processing of collecting a traffic amount between the nodes from a traffic monitoring apparatus arranged between predetermined nodes in a mobile network; and outputting control information to the predetermined nodes based on a report received from the traffic monitoring apparatus, the control information instructing the predetermined nodes to level the traffic amount. This program may be recorded on a computer readable storage medium. That is, the present invention may also be implemented as a computer program product.

The meritorious effects of the present invention are summarized as follows.
According to the present invention, the traffic amount in a mobile network can be leveled off. The reason is that the traffic control apparatus is provided that outputs control information to predetermined nodes based on the reports from the traffic monitoring apparatuses arranged among the predetermined nodes in the mobile network.

PREFERRED MODES

Figure 1:
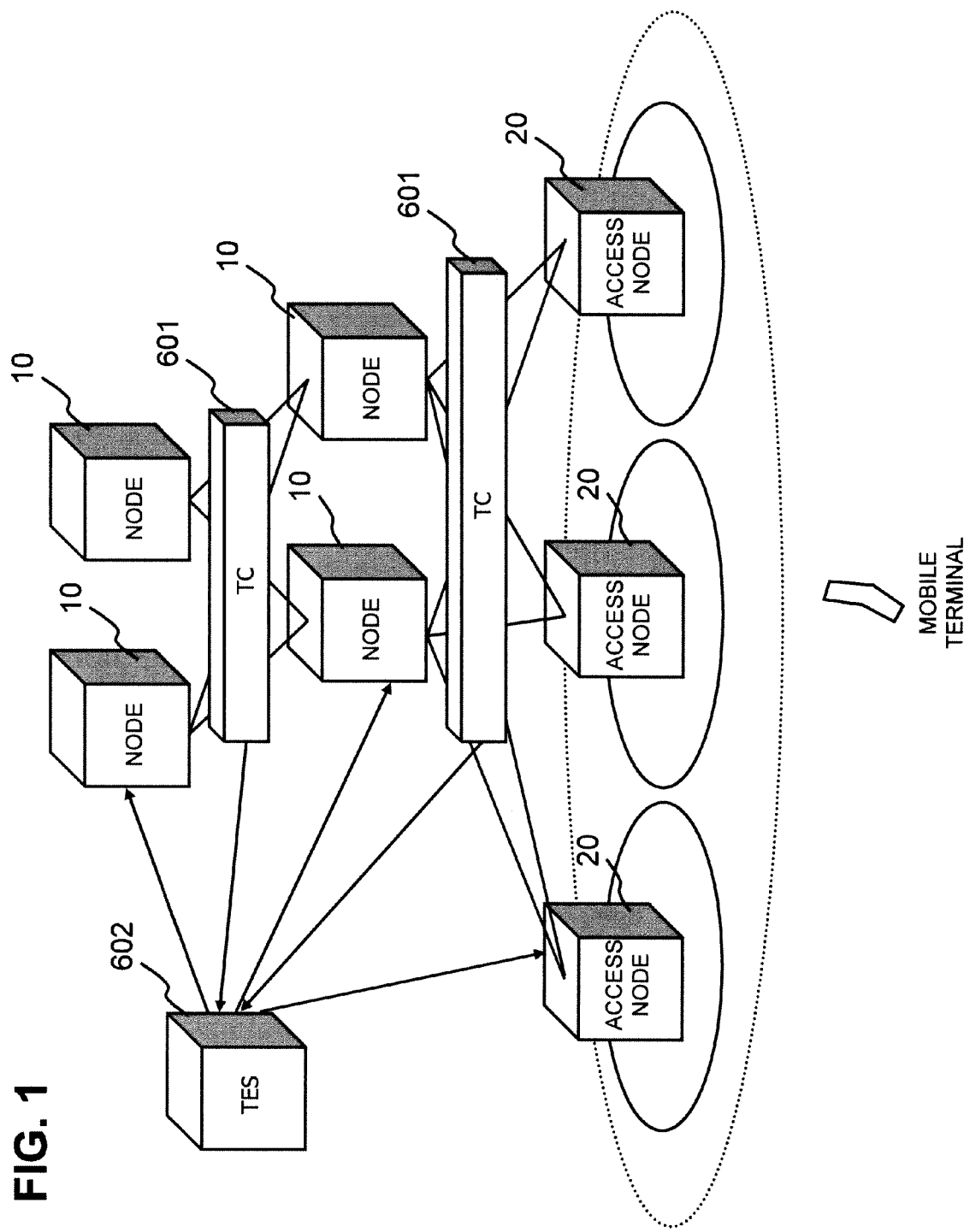
FIG. 1 is a diagram showing the outline of the present invention.

First, the following outlines the present invention with reference to FIG. 1. According to the present invention, an apparatus for monitoring the usage status of a mobile network (traffic monitoring apparatus; TC 601 in FIG. 1) and an apparatus for controlling the network nodes for utilizing the communication bandwidths of the mobile network (traffic control apparatus; TES 602 in FIG. 1) are arranged to level off the traffic flowing in the mobile network. Note that the drawing reference numerals used in the outline are exemplary only to help understand the present invention and not to limit the present invention to the exemplary embodiments shown.

The traffic monitoring apparatus (TC 601 in FIG. 1), arranged among different types of node in the mobile network, monitors the usage status of the mobile network, collects information on the amount of data flowing in U-Plane and IP addresses, and reports the collected information to the traffic control unit (TES 602 in FIG. 1). Based on the report content from the traffic monitoring apparatuses, the traffic control apparatus (TES 602 in FIG. 1) acquires the traffic generation status in the mobile network. And, for example, when the traffic is unevenly distributed to (concentrates in) a particular position, the traffic control apparatus identifies a node, which is the same type of node as the one in which the traffic concentrates and which has sufficient bandwidth, from access nodes 20 or nodes 10 according to the uneven distribution of the traffic and outputs the control information instructing that the traffic is to be distributed to the identified node.

The control information and its destination nodes are selected according to the uneven distribution status of the traffic as follows. For example, in the case of FIG. 15, the control information is transmitted to instruct that the coverage area of an eNB a 501 is decreased and the coverage area of the neighboring eNB b 502 is increased according to the concentration status of the traffic amount at point E. By doing so, the traffic amount at point E is distributed among the other nodes at the same hierarchy and, therefore, the traffic amount is leveled among all the nodes.

Figure 15:
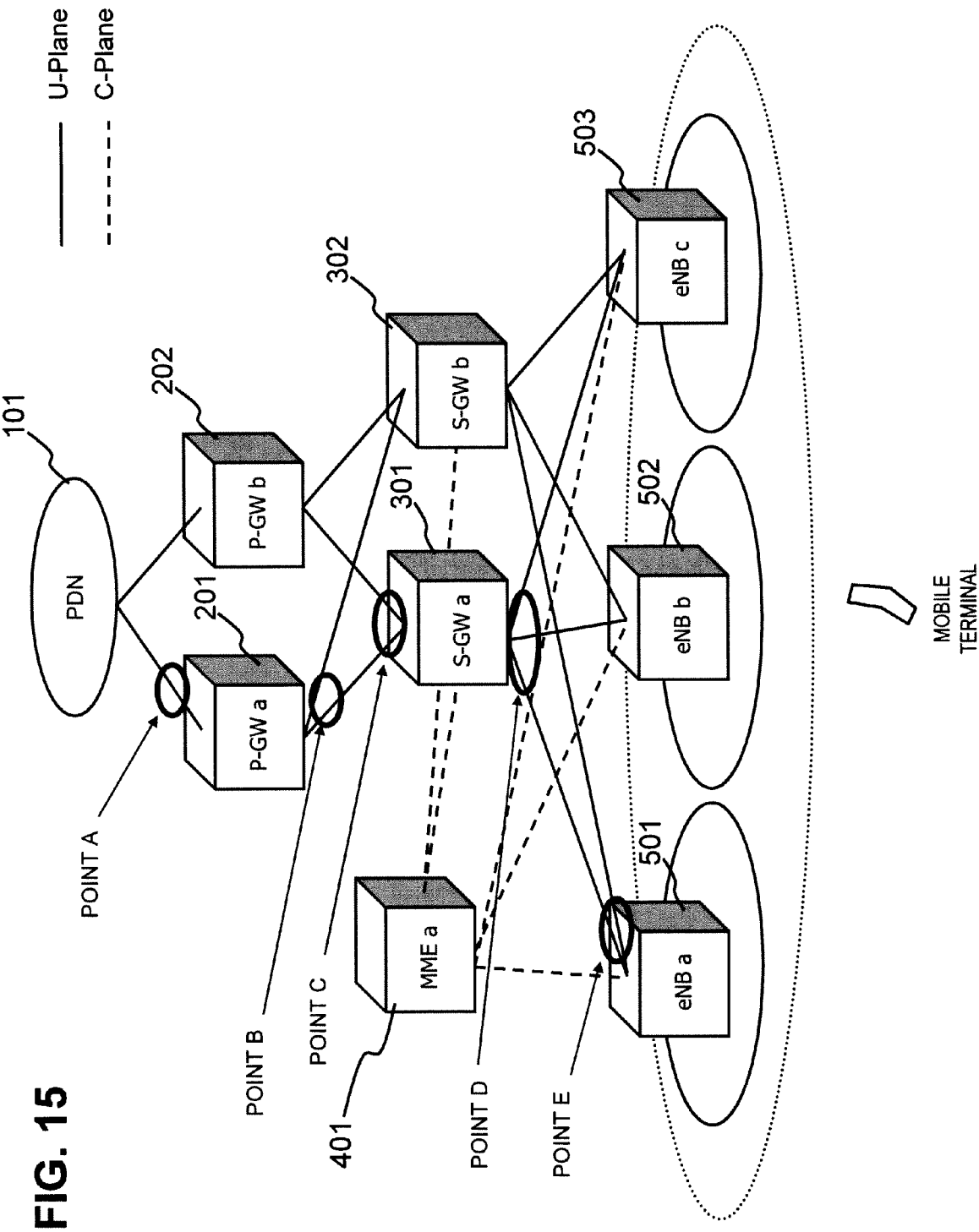
FIG. 15 is a diagram showing points where a bottle neck will occur in a mobile network.

Also, in FIG. 15, the control information is transmitted to an S-GW a 301 and an S-GW b 302 to instruct that one or more calls accommodated in the S-GW a 301 are accommodated in the S-GW b 302 according to the concentration status of the traffic amount at points C and D. By doing so, the traffic amount at points C and D in FIG. 15 is distributed to other nodes at the same hierarchy and, therefore, the traffic amount is leveled among all the nodes.

Also, it is possible to perform control in FIG. 15 to make it difficult for the traffic-concentrated nodes, S-GW a 301 and P-GW a 201, to be selected when connecting a new call according to the concentration status of the traffic amount at points A-D. By doing so, the traffic amount at points A-D in FIG. 1 is distributed to other nodes at the same hierarchy and, therefore, the traffic amount is leveled among all the nodes.

In the present invention, the following modes are possible.

[First Mode]

See the mobile communication system in the first aspect above.

[Second Mode]

Preferably, the traffic monitoring apparatus monitors a traffic amount of two or more paths between different types of nodes in the mobile network, the two or more paths being formed including at least one node different, and the traffic control apparatus selects a control information type and a destination node according to an uneven-distribution status of traffic and outputs control information instructing that the traffic amount of a node, where traffic is unevenly distributed, be distributed to another node having the same type of node.

[Third Mode]

Preferably, one of control information types and destinations selected by the traffic control apparatus according to the uneven-distribution status of traffic is information that, when traffic between an access node and a higher-level access node exceeds a predetermined threshold, instructs the access node to decrease a coverage area thereof and an access node neighboring to the access node to increase a coverage area thereof.

[Fourth Mode]

Preferably, one of control information types and destinations selected by the traffic control apparatus according to the uneven-distribution status of traffic is information that, when the traffic of a node exceeds a predetermined threshold, causes a call accommodated by the node to be handed over to another node that can accommodate the call.

[Fifth Mode]

Preferably, one of control information types and destinations selected by the traffic control apparatus according to the uneven-distribution status of traffic is information used to change a selection ratio of a higher-level node, selected by a node when a new call is connected, based on the traffic amount between the nodes.

[Sixth Mode]

Preferably, the traffic control apparatus comprises:

a traffic analysis unit that, when traffic between an access node and a higher-level access node exceeds a predetermined threshold, instructs the access node to decrease a coverage area thereof and an access node neighboring to the access node to increase a coverage area thereof;

a handover starting unit that, when the traffic of a node exceeds a predetermined threshold, causes a call accommodated by the node to be handed over to another node that can accommodate the call; and a selection ratio calculation unit that changes a selection ratio of a higher-level node, selected by a node when a new call is connected, based on the traffic amount between the nodes.

[Seventh Mode]

Preferably, the traffic monitoring apparatus is connected to an input/output port of the predetermined node for monitoring the traffic amount.

[Eighth Mode]

Preferably, the traffic monitoring apparatus comprises:

an IP address monitoring unit that monitors a transmission source IP address and a transmission destination IP address of monitored data;

a URL analysis unit that acquires a URL (Uniform Resource Locator) corresponding to the IP address; and a data cache unit that caches data for each of the acquired URLs and, when access is concentrated on a particular URL during a predetermined period, returns the cached data to a requesting source.

[Ninth Mode]

Preferably, when the monitored traffic amount exceeds a predetermined threshold, the traffic monitoring apparatus reports the traffic amount to the traffic control apparatus.

[Tenth Mode]

See the traffic control apparatus in the second aspect above.

[Eleventh Mode]

Preferably, the traffic control apparatus is connected to the traffic monitoring apparatus, the traffic monitoring apparatus being arranged between different types of nodes in the mobile network to monitor a traffic amount of two or more paths formed including at least one node different, and selects a control information type and a destination node according to an uneven-distribution status of traffic reported by each of the traffic monitoring apparatuses and outputs control information instructing that the traffic amount of a node, where traffic is unevenly distributed, be distributed to another node having the same type of node.

[Twelfth Mode]

Preferably, one of control information types and destinations selected according to the uneven-distribution status of traffic is information that, when traffic between an access node and a higher-level access node exceeds a predetermined threshold, instructs the access node to decrease a coverage area thereof and an access node neighboring to the access node to increase a coverage area thereof.

[Thirteenth Mode]

Preferably, one of control information types and destinations selected according to the uneven-distribution status of traffic is information that, when the traffic of a node exceeds a predetermined threshold, causes a call accommodated by the node to be handed over to another node that can accommodate the call.

[Fourteenth Mode]

Preferably, one of control information types and destinations selected according to the uneven-distribution status of traffic is information used to change a selection ratio of a higher-level node, selected by a node when a new call is connected, based on the traffic amount between the nodes.

[Fifteenth Mode]

Preferably, the traffic control apparatus comprises:

a traffic analysis unit that, when traffic between an access node and a higher-level access node exceeds a predetermined threshold, instructs the access node to decrease a coverage area thereof and an access node neighboring to the access node to increase a coverage area thereof;

a handover starting unit that, when the traffic of a node exceeds a predetermined threshold, causes a call accommodated by the node to be handed over to another node that can accommodate the call; and a selection ratio calculation unit that changes a selection ratio of a higher-level node, selected by a node when a new call is connected, based on the traffic amount between the nodes.

[Sixteenth Mode]

See the traffic monitoring apparatus in the third aspect above.

[Seventeenth Mode]

Preferably, the traffic monitoring apparatus comprises:

an IP address monitoring unit that monitors a transmission source IP address and a transmission destination IP address of monitored data;

a URL analysis unit that acquires a URL (Uniform Resource Locator) corresponding to the IP addresses; and a data cache unit that caches data for each of the acquired URLs and, when access is concentrated on a particular URL during a predetermined period, returns the cached data to a requesting source.

[Eighteenth Mode]

See the mobility management entity in the fourth aspect above.

[Nineteenth Mode]

See the access node in the fourth aspect above.

[Twentieth Mode]

See the traffic leveling method in the fifth aspect above.

[Twenty-First Mode]

See the program in the sixth aspect above.

First Exemplary Embodiment

Figure 2:
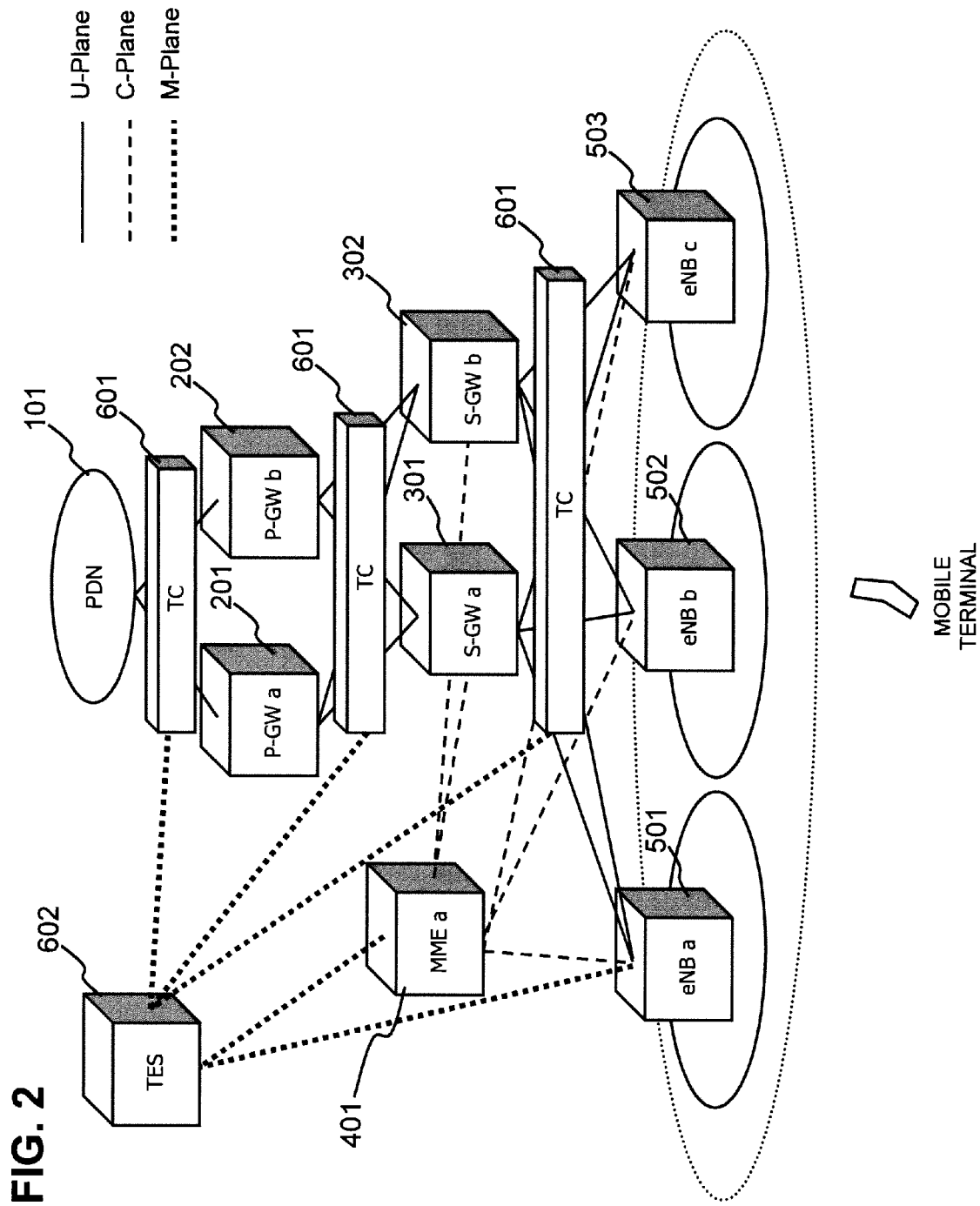
FIG. 2 is a diagram showing the configuration of a mobile communication system in a first exemplary embodiment of the present invention.

Next, a first exemplary embodiment of the present invention will be described in detail below with reference to the drawings. FIG. 2 is a diagram showing the configuration of a mobile communication system in the first exemplary embodiment of the present invention. Referring to FIG. 2, multiple traffic monitoring apparatuses (traffic counter, hereinafter called a "TC") 601 are arranged among the nodes in a mobile network configured as an LTE (Long Term Evolution)/EPC (Evolved Packet Core) network. Although an example of the LTE/EPC network is used in the example in FIG. 1, the present invention is applicable to other mobile networks.

A TC 601 is an apparatus that has the function to collect information such as the data amount of U-Plane (user plane) data flowing in the mobile network and the IP addresses. As many TCs 601 as necessary are installed between the different types of nodes in the mobile network, for example, between eNBs 501-503 and S-GWs 301 and 302, between S-GWs 301 and 302 and P-GWs 201 and 202, and between P-GWs 201 and 202 and PDN 101, to monitor the traffic amount between different types of nodes in the mobile network at least one of which has two or more different paths. The TC 601 in this exemplary embodiment has a data cache unit (see data cache unit 704 in FIG. 3) in which U-Plane data, as well as its associated URL (Uniform Resource Locator), is stored (cached) for a predetermined time to implement the function that, when access is concentrated on a particular URL during a predetermined time, returns cache data without flowing the U-Plane data to the HTTP server corresponding to the URL.

A traffic control apparatus (traffic engineering server, hereinafter called "TES") 602 collects information from the TCs 601 via the M-Plane (management plane) and works with the eNBs 501-503 and an MME 401 to level the traffic of the entire mobile network. The TES 602, though configured to have the functions described above, may have the function of the SON(Self Organizing Network) server.

The P-GWs 201 and 202 are gateways each of which is the point of connection to the PDN 101, and the S-GWs 301 and 302 are gateways each of which accommodates a call and transmits data. The MME 401, connected to the S-GWs 301 and 302 and the eNBs 501-503 via the C-plane (control plane), is an apparatus that performs the mobility management such as the mobile terminal location registration processing, terminal call processing when a call is received, and handover between radio base stations. The eNBs 501-503 are base stations each of which has a coverage area and accepts access from a mobile terminal located in the coverage area.

In this exemplary embodiment, to perform the handover processing started by the MME 401, the eNBs 501-503 are assumed to have the ability to maintain the U-Plane path on the radio side and to change the U-Plane path for the s-GW.

Figure 3:
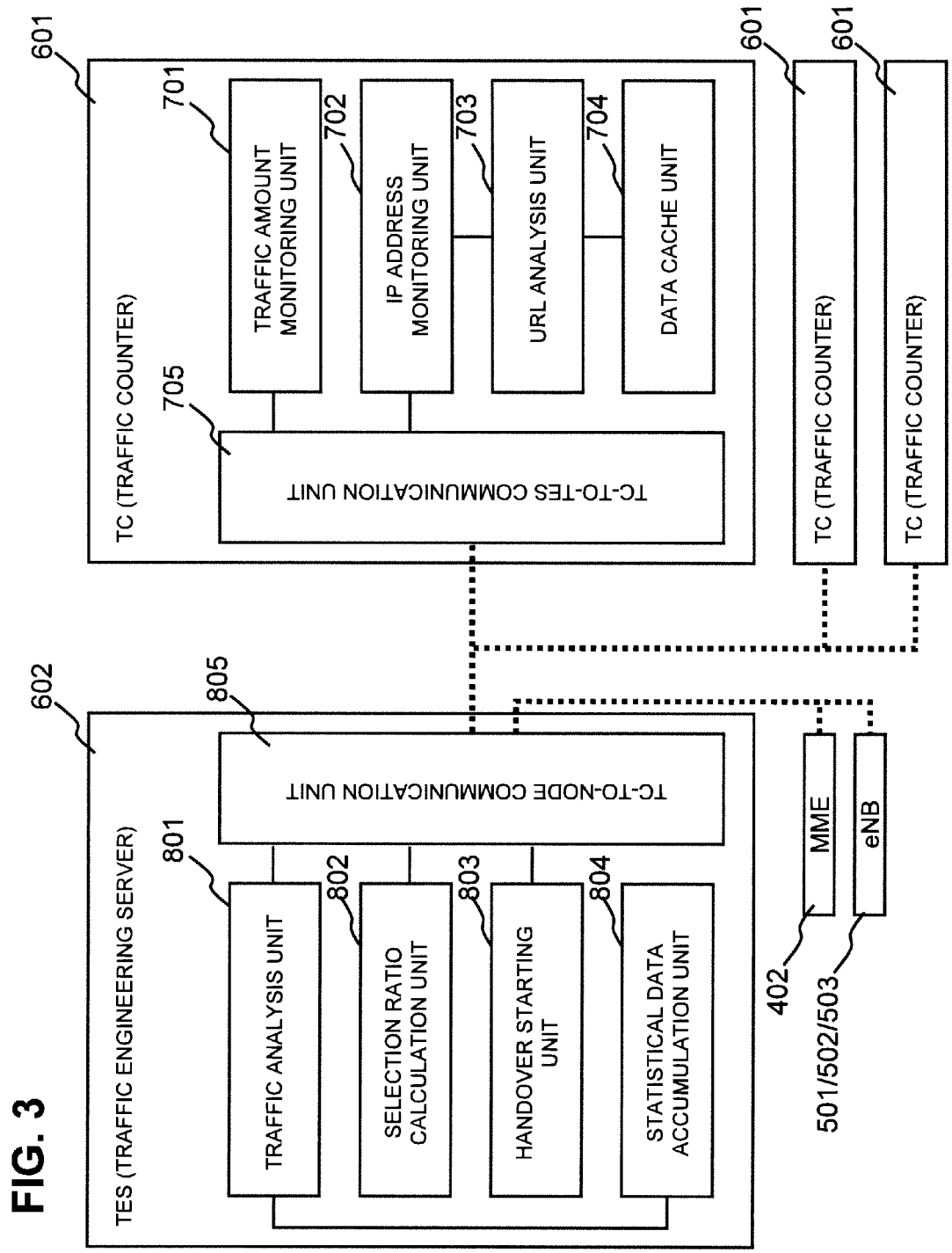
FIG. 3 is a diagram showing the configuration of a traffic monitoring apparatus and a traffic control apparatus in the first exemplary embodiment of the present invention.

FIG. 3 is a block diagram showing the detailed configuration of the TC 601 and the TES 602 described above. Referring to FIG. 3, the TC 601 includes a traffic amount monitoring unit 701, an IP address monitoring unit 702, a URL analysis unit 703, a data cache unit 704, and a TC-to-TES communication unit 705. These units operate as follows.

The traffic amount monitoring unit 701 observes the data amount of U-Plane data flowing among mobile network nodes.

The IP address monitoring unit 702 monitors the source IP address and the destination IP address of U-Plane data. This information may be used to determine a node in the mobile network that transmits data and a node that receives data.

The URL analysis unit 703 analyzes a URL accessed by the user, based on the IP address acquired by the IP address monitoring unit 702. The data cache unit 704 stores the cache data of the URL, analyzed by the URL analysis unit 703, for a predetermined time and returns it as necessary. When access is temporarily concentrated on a particular URL, the URL analysis unit 703 and the data cache unit 704, which perform the processing described above, allow the TC 601 to return the cache data directly without having to access the HTTP server corresponding to the URL. This configuration reduces the amount of data flowing in the network.

The TC-to-TES communication unit 705 uploads (reports) data, collected by the traffic amount monitoring unit 701 and the IP address monitoring unit 702, to the TES 602.

The processing performed by the traffic amount monitoring unit 701, IP address monitoring unit 702, URL analysis unit 703, and data cache unit 704 may be implemented by the programs that cause the computer configuring the TC 601 to use its hardware to execute the processing corresponding to respective units.

The function corresponding to the traffic amount monitoring unit 701, IP address monitoring unit 702, and TC-to-TES communication unit 705 may also be implemented by the method, equivalent to that of the OpenFlow switch described in Non Patent Documents 1 and 2, wherein statistical information is collected via matching with a flow entry stored in the flow table for transmission to the higher-level apparatus (OpenFlow controller). This method allows the TC 601 itself to have the forwarding function, giving cost advantages. This method also gives the ability to remove a particular flow from the monitoring candidates, offering the advantage that the traffic can be monitored more in detail.

Figure 4:
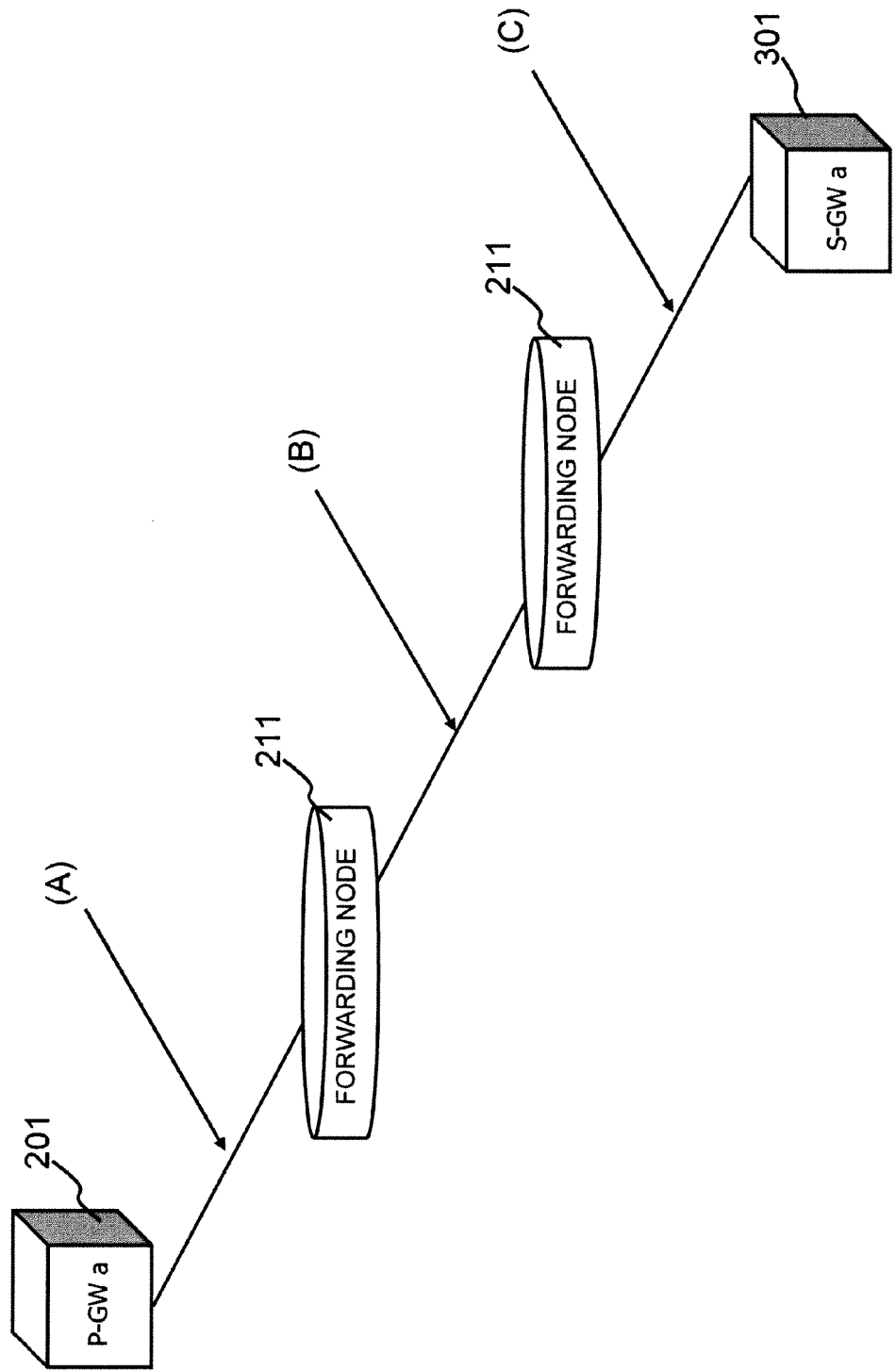
FIG. 4 is a diagram showing the arrangement position of the traffic monitoring apparatus in the first exemplary embodiment of the present invention.

FIG. 4 is a diagram showing the arrangement position of the TC 601 described above. The TC 601 may be installed in any of the positions (A)-(C) in FIG. 4, preferably in a position such as position (A) or (C) in FIG. 4 where the TC 601 is connected to the input/output port of the P-GW a 201 or S-GW a 301 not via another forwarding node 211. Such an arrangement allows the input/output data amount of the P-GW a 201 and the S-GW a 301 to be measured respectively. The TC 601 may also be positioned in position (B). In this case, the traffic amount monitoring unit 701 works with the IP address monitoring unit 702 to determine the node that has transmitted or received traffic and then measures the input/output data amount of the P-GW a 201 and S-GW a 301 respectively.

Returning to FIG. 3, the following describes the configuration of the TES 602. The TES 602 includes a traffic analysis unit 801, a selection ratio calculation unit 802, a handover starting unit 803, a statistical data accumulation unit 804, and a TC-to-node communication unit 805. Those units operate as follows.

Figure 5:
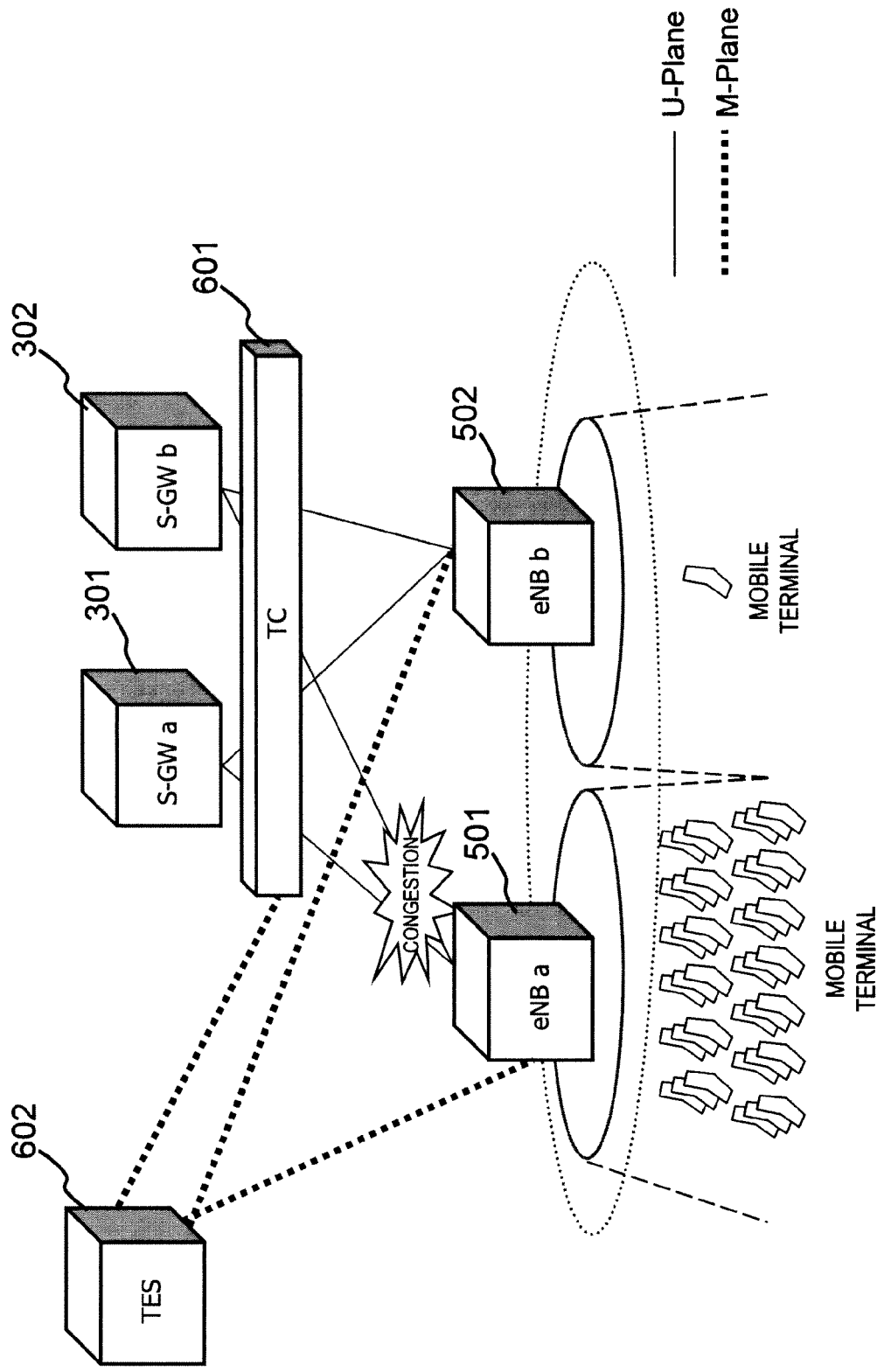
FIG. 5 is a diagram showing the operation of a traffic analysis unit of the traffic control apparatus in the first exemplary embodiment of the present invention.
Figure 6:
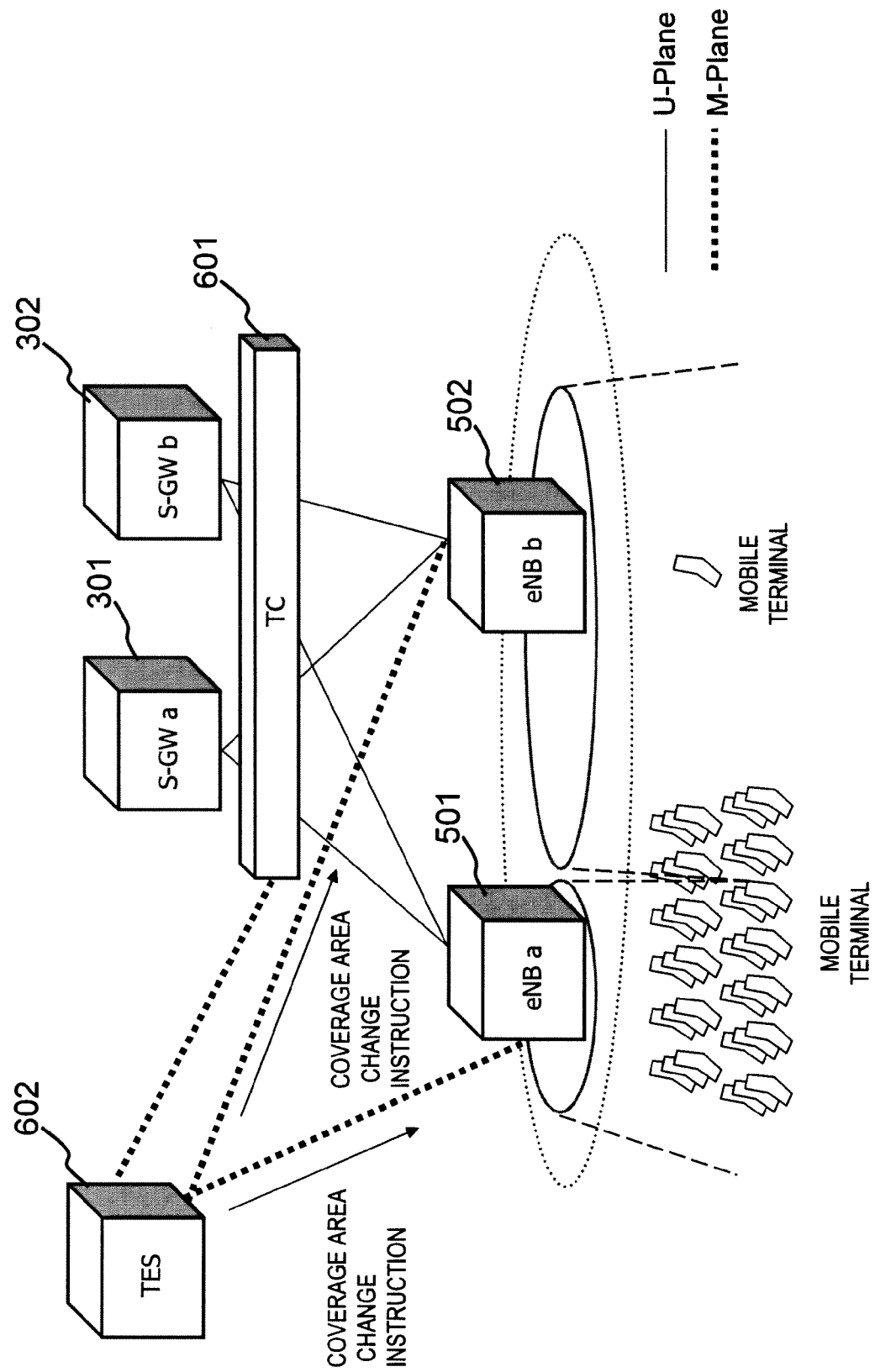
FIG. 6 is a second diagram showing the operation of the traffic analysis unit of the traffic control apparatus in the first exemplary embodiment of the present invention.
Figure 7:
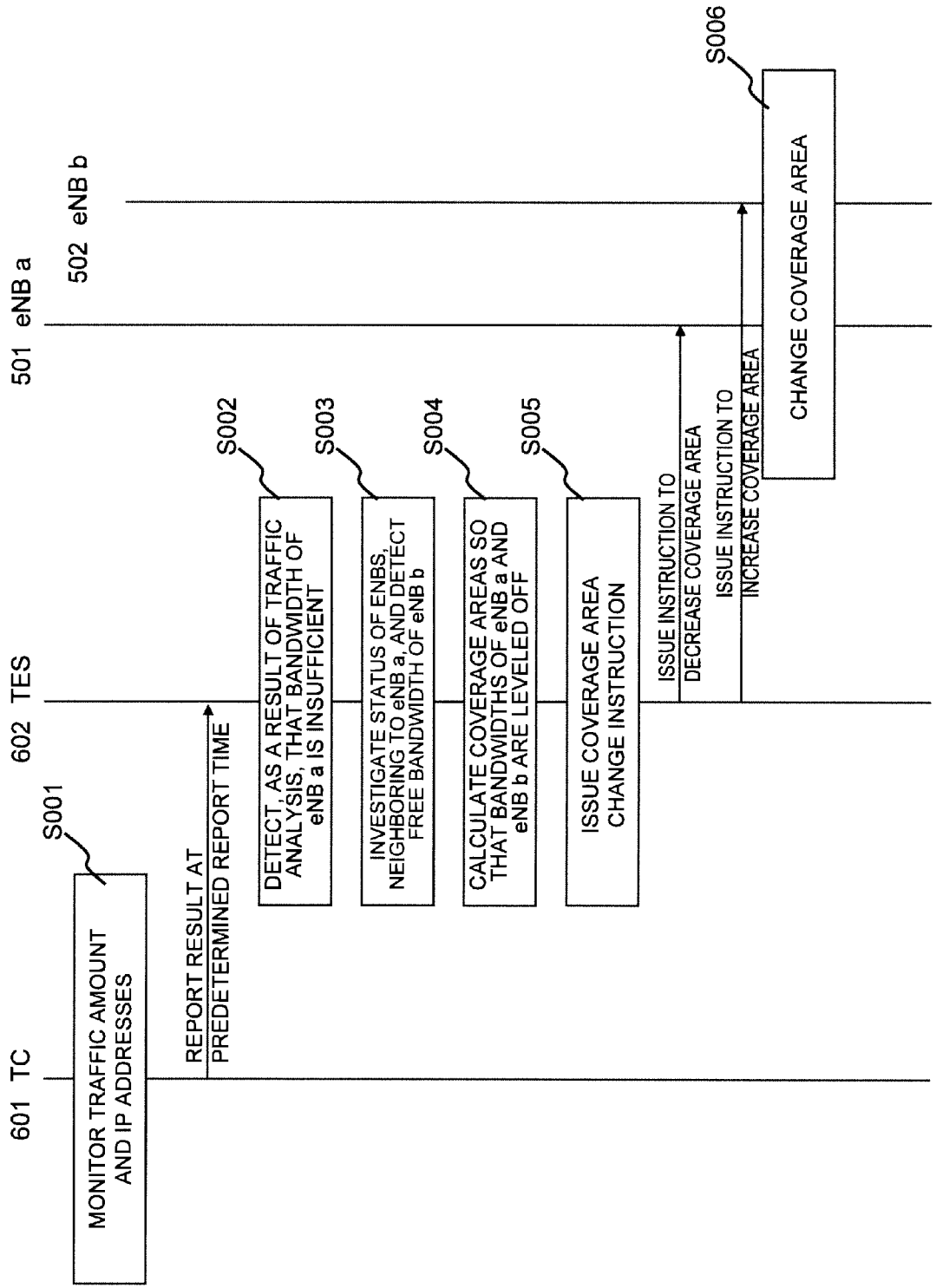
FIG. 7 is a flowchart showing the operation of the traffic control apparatus in the first exemplary embodiment of the present invention.

The traffic analysis unit 801 checks the communication bandwidth used by the nodes, or the traffic distribution, of the mobile network based on the information on the data amount and the IP addresses collected by the TC 601 and, if necessary, issues an eNB coverage area optimization instruction (see FIG. 5 to FIG. 7). In this exemplary embodiment, the traffic analysis unit 801 also performs processing necessary for the SON server that performs automatic cooperative control among eNBs.

The selection ratio calculation unit 802 calculates the S-GW/P-GW selection ratio data when a new call is connected, while considering the communication bandwidth used by the nodes of the mobile network. This S-GW/P-GW selection ratio data is referenced when the MME 401 selects a gateway from the S-GWs 301 and 302 or P-GWs 201 and 202. Using the S-GW/P-GW selection ratio data, the MME 401 can select a gateway, which uses a smaller amount of communication bandwidth, from the S-GWs 301 and 302 or P-GWs 201 and 202.

Based on the communication bandwidth used by the nodes of the mobile network analyzed by the traffic analysis unit 801, the handover starting unit 803 determines a call, for which handover is to be started to reduce the communication bandwidth of a particular node, and instructs the MME 401 to start handover.

The statistical data accumulation unit 804 accumulates therein the data, analyzed by the traffic analysis unit 801, as the reference data for use by the maintenance engineer in optimizing the network configuration from a long-term perspective.

The TC-to-node communication unit 805 communicates with the TCs 601, transmits a coverage area change notification from the traffic analysis unit 801 to the eNBs 501-503, transmits an S-GW/P-GW selection ratio data notification from the selection ratio calculation unit 802 to the MME 401, and transmits a handover processing start notification from the handover starting unit 803 to the MME 401.

The traffic analysis unit 801, selection ratio calculation unit 802, handover starting unit 803, and statistical data accumulation unit 804 may be implemented by the programs that cause the computer configuring the TES 602 to use its hardware to execute the processing corresponding to a respective unit.

The function corresponding to the traffic analysis unit 801, statistical data accumulation unit 804, and TC-to-node communication unit 805 may also be implemented by the method, equivalent to that of the OpenFlow controller described in Non Patent Documents 1 and 2 wherein statistical information is acquired from the OpenFlow switches for path setting. In this case, the TES 602 itself has the path control function of the flow flowing in the mobile network separately from several types of traffic leveling processing that will be described later. The collected traffic status may also be used by the TES 602 for path setting.

Next, the following describes the operation of this exemplary embodiment with reference to the drawings.

[Changing eNB Coverage Areas]

First, the following describes coverage area change processing for the eNBs 501-503 performed as instructed by the traffic analysis unit 801.

FIG. 5 and FIG. 6 are diagrams showing the operation of the traffic analysis unit 801 of the TES 602. FIG. 5 shows the state before the traffic analysis unit 801 issues a coverage area change instruction.

In the example in FIG. 5, both the eNB a 501 and the eNB b 502 are accommodated by both the S-GW a 301 and S-GW b 302 via S1-Flex. The example in FIG. 5 shows that many mobile terminals (including communication modules) are under control of the eNB a 501 and are in communication and that the communication bandwidth of the eNB a 501 for communication with the S-GW is congested (the traffic amount exceeds a predetermined threshold).

FIG. 6 shows a coverage area change instruction, issued by the traffic analysis unit 801, and the resulting changed state of the coverage area. When congestion such as the one shown in FIG. 5 is detected, the traffic analysis unit 801 calculates the coverage areas, which are to be notified to the eNB a 501 and eNB b 502, so that the traffic is leveled by moving the traffic amount of the eNB a 501 to the eNB b 502 and, as shown in FIG. 6, issues coverage area change instructions to the eNB a 501 and the eNB b 502. In the example in FIG. 6, the traffic analysis unit 801 issues the two coverage area change instructions, one to decrease the coverage area of the eNB a 501 and the other to increase the coverage area of the eNB b 502.

For the mobile terminals that are originally accommodated by the eNB a 501 but are to be moved to the coverage area of the eNB b 502 as a result of the change in the coverage areas, the handover processing is started and the U-Plane path is switched to the path via the eNB b 502. As the result, the communication bandwidth for communication with the S-GW is leveled off between the eNB a 501 and the eNB b 502.

FIG. 7 is a diagram showing the processing flow to the time the eNB coverage area change instructions are issued as described above. As shown in FIG. 7, the TC 601 installed between the eNBs 501-503 and the S-GWs 301 and 302 monitors (collects) the information such as the data amount of the U-Plane data and the IP addresses (step S001) and reports the monitored result to the TES 602 at a predetermined report time, for example, at regular intervals, at a fixed time, or when the traffic amount changes suddenly.

The TES 602 analyzes the traffic information received from the TC 601. Assume that, as a result of the traffic analysis, congestion is detected in the communication bandwidth of the eNB a 501 for communication with the S-GW (step S002). If it is determined as a result of the traffic analysis that the coverage areas need not be changed, the subsequent processing is omitted (note that the handover start processing or the selection ratio calculation processing, which will be described later, are performed if necessary).

Next, the TES 602 investigates the status of the eNBs neighboring to the eNB a 501 and detects an eNB, which has sufficient communication bandwidth, as well as its free bandwidth for communication with the S-GW. In this example, assume that the eNB b 502 neighboring to the eNB a 501 is detected (step S003).

Next, based on the traffic status analyzed in step S002 and the free bandwidth for communication with the S-GW detected in step S003, the TES 602 calculates the coverage area of the eNB a 501 and that of the eNB b 502 so that the communication bandwidths of the two eNBs for communication with the S-GW are leveled off (step S004).

Next, the TES 602 issues the coverage area change instruction, which includes the calculated coverage area information, to the eNB a 501 and the eNB b 502 (step S005). In this example, because congestion is detected in the eNB a 501, an instruction to decrease the coverage area is issued to the eNB a 501, and an instruction to increase the coverage area to the eNB b 502.

In response to the instruction, the eNB a 501 and the eNB b 502 respectively change the coverage area according to the instruction from the TES 602 (step S006).

The handover processing is performed for the mobile terminals that are accommodated in the changed coverage area, that is, for the mobile terminals that have been located in the coverage area of the eNB a 501 but that are to be moved the coverage area of the eNB b 502. Changing the coverage area of eNBs in this way avoids congestion in the communication bandwidth of the eNBs for communication with the S-GW, thus allowing the traffic to be leveled off.

Although congestion in the communication bandwidth of an eNB for communication with an S-GW is described in the example above, changing the eNB coverage areas is efficient also when the communication bandwidth of an S-GW for communication with an eNB is congested or when the communication bandwidth of an S-GW for communication with the P-GW is congested. The reason is that starting the mobile terminal handover causes the nodes to be re-selected according to the selection ratio, calculated based on the traffic status as will be described later and, as a result, congestion in the higher-level nodes can be leveled off.

Although congestion in the eNB a 501 is leveled off using the eNB b 502 in the example above, three or more eNBs may also be used to level off the traffic. For example, bandwidth insufficiency in the eNB b 502 may be leveled off using the eNB a 501 and the eNB c 503 or bandwidth insufficiency in the eNB a 501 and the eNB c 503 may be leveled off using the eNB b 502.

[Starting Handover]

Next, the following describes the handover processing performed by the handover starting unit 803 for an accommodated call.

Figure 8:
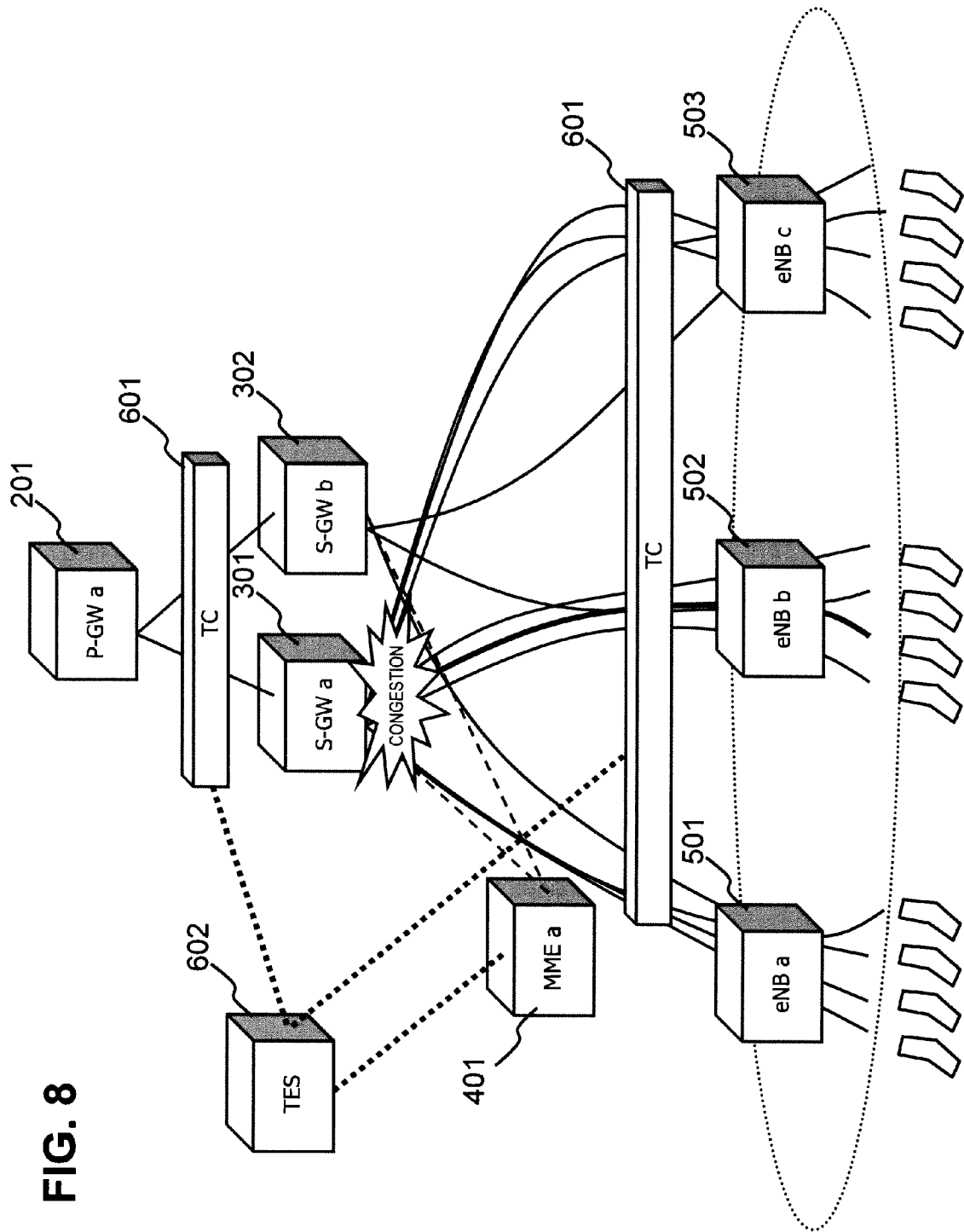
FIG. 8 is a diagram showing the operation of a handover starting unit of the traffic control apparatus in the first exemplary embodiment of the present invention.
Figure 9:
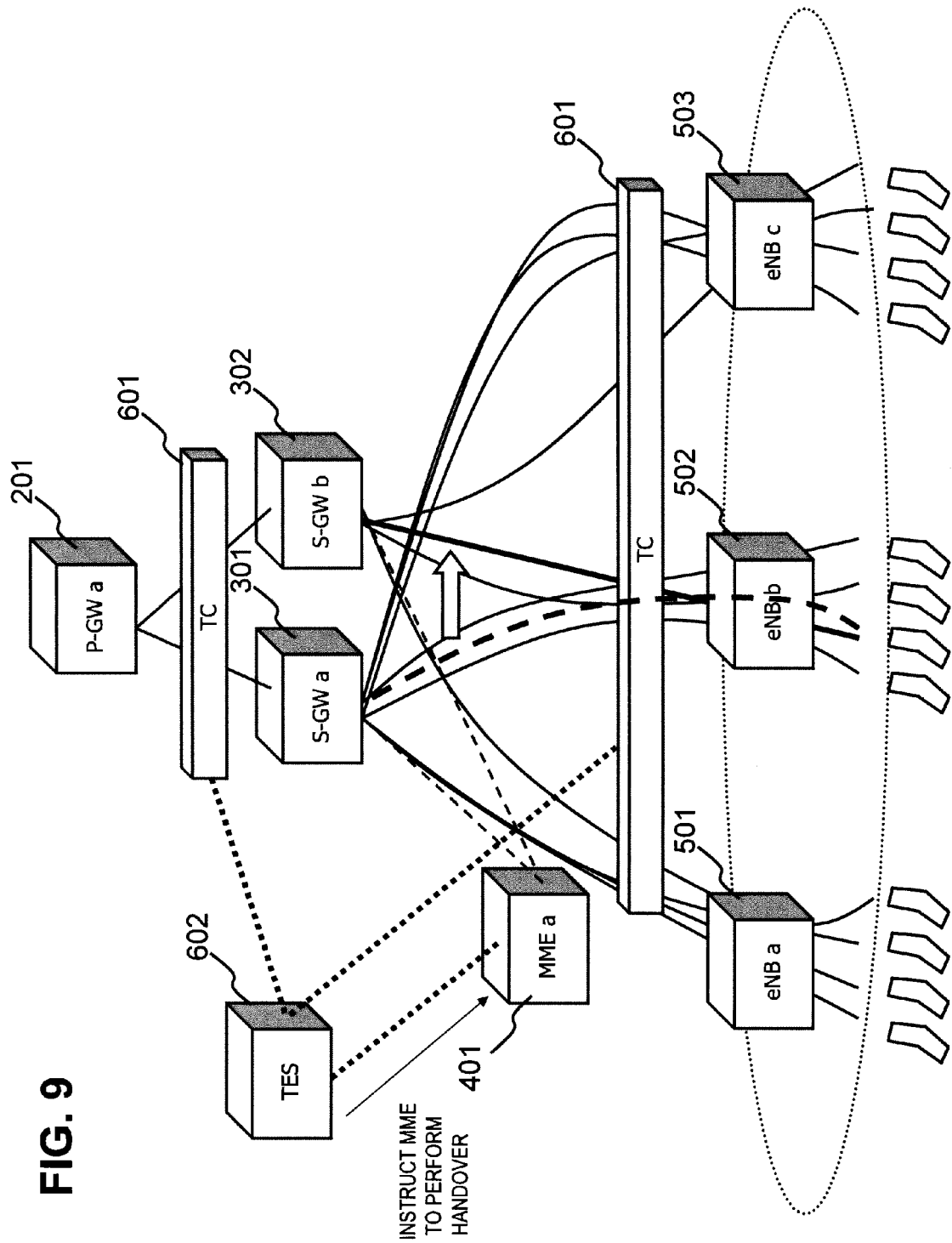
FIG. 9 is a second diagram showing the operation of the handover starting unit of the traffic control apparatus in the first exemplary embodiment of the present invention.

FIG. 8 and FIG. 9 are diagrams showing the operation of the handover starting unit 803 of the TES 602 described above. FIG. 8 shows the state before the handover starting unit 803 starts the handover processing.

In the example shown in FIG. 8, all of the eNB a 501, eNB b 502, and eNB c 503 are accommodated by both the S-GW a 301 and the S-GW b 302 via S1-Flex. Mobile terminals are in the range of each of the eNB a 501, eNB b 502, and eNB c 503. In the example in FIG. 8, more mobile terminals set a U-Plane path and communicate with the S-GW a 301 than with the S-GW b 302 and, therefore, the communication bandwidth of the S-GW a 301 for communication with the eNBs is congested (the traffic amount exceeds the threshold).

FIG. 9 shows the state in which the handover start processing is performed by the handover starting unit 803. When congestion such as the one shown in FIG. 8 is detected, the handover starting unit 803 instructs the MME 401 to start handover by moving the traffic amount of the S-GW a 301 for the eNB a to the S-GW b 302 so that the traffic is leveled off. As a result, the U-Plane path (bold broken line) accommodated by the S-GW a 301 is accommodated by the S-GW b 302 as shown by the arrow in FIG. 9 (see the bold solid line in the figure).

Figure 10:
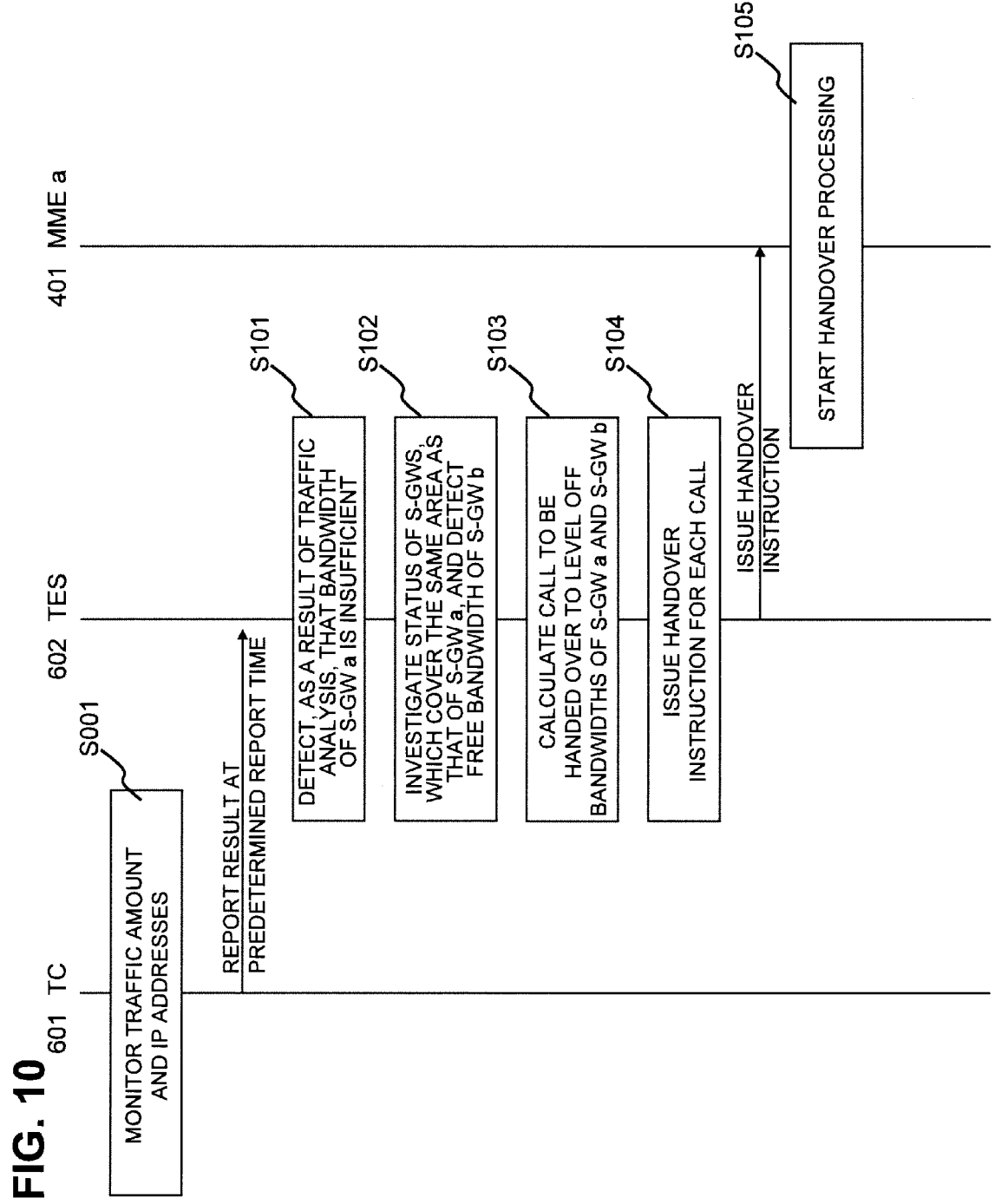
FIG. 10 is a second flowchart showing the operation of the traffic control apparatus in the first exemplary embodiment of the present invention.

FIG. 10 is a diagram showing the processing flow to the time the handover is started. As shown in FIG. 10, the TC 601 installed between the eNBs 501-503 and the S-GWs 301 and 302 monitors (collects) the information such as the data amount of the U-Plane data and the IP addresses (step S001) and reports the monitored result to the TES 602 at a predetermined report time, for example, at regular intervals, at a fixed time, or when the traffic amount changes suddenly. This report may also include the report on the coverage area change processing described above.

The TES 602 analyzes the traffic information received from the TC 601. Assume that, as a result of the traffic analysis, congestion is detected in the communication bandwidth of the S-GW a 301 for communication with the eNBs (step S101). If it is determined as a result of the traffic analysis that the handover need not be started, the subsequent processing is omitted (note that the coverage area change processing described above or the selection ratio calculation processing, which will be described later, are performed if necessary).

Next, the TES 602 investigates the status of an S-GW that accommodates the same eNBs as those accommodated by the S-GW a 301 and detects an S-GW, which has sufficient communication bandwidth, as well as its free bandwidth for communication with the eNBs. In this example, assume that the S-GW b 302, which accommodates the same eNBs as those accommodated by the S-GW a 301, is detected (step S102).

Next, based on the traffic status analyzed in step S101 and the free bandwidth for communication with the eNBs detected in step S102, the TES 602 calculates the U-Plane path, which is included in the U-Plane paths accommodated by the S-GW a 301 and which is to be handed over, so that the communication bandwidths of the two S-GWs for communication with eNBs are leveled off (step S103).

Next, the TES 602 instructs the MME 401 to start handover with the calculated U-Plane path specified (step S104). In this example, because congestion is detected in the eNB a 501, an instruction to decrease the coverage area is issued to the eNB a 501, and an instruction to increase the coverage area to the eNB b 502.

The MME 401 starts the handover processing for the specified call (step S105). In this way, the S-GW a 301 and the S-GW b 302 work with eNBs to change the U-Plane path, which is accommodated by the S-GW a 301 and is specified, to the S-GW b 302.

The handover processing is started via the MME 401 as described above. This handover processing avoids congestion in the communication bandwidth of an S-GW for communication with eNBs and levels the traffic with the mobile terminals kept connected.

[Changing Node Selection Ratios]

Next, the following describes the node selection ratio change processing performed by the selection ratio calculation unit 802 when a new call is connected.

Figure 11:
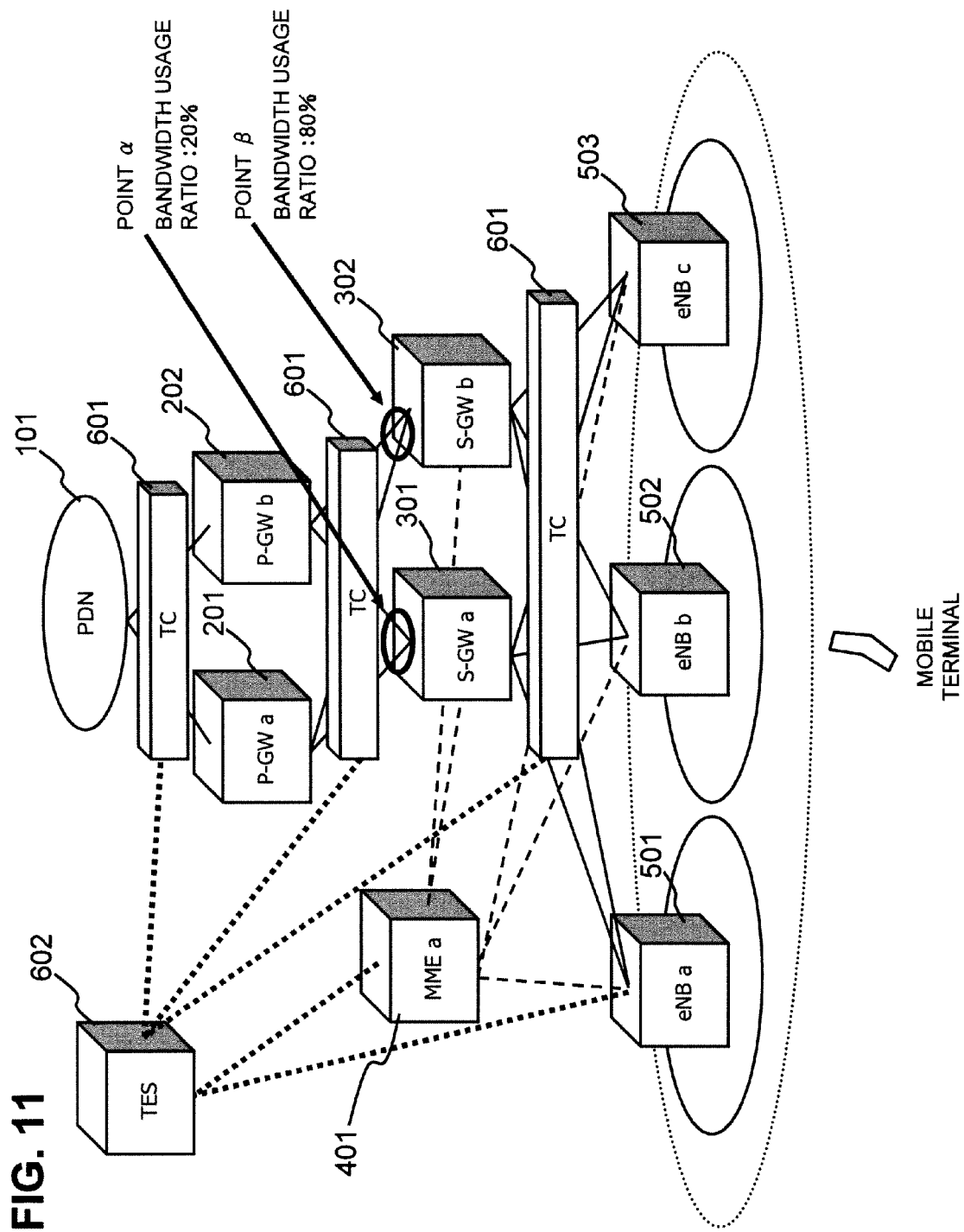
FIG. 11 is a diagram showing the operation of a selection ratio calculation unit of the traffic control apparatus in the first exemplary embodiment of the present invention.
Figure 12:
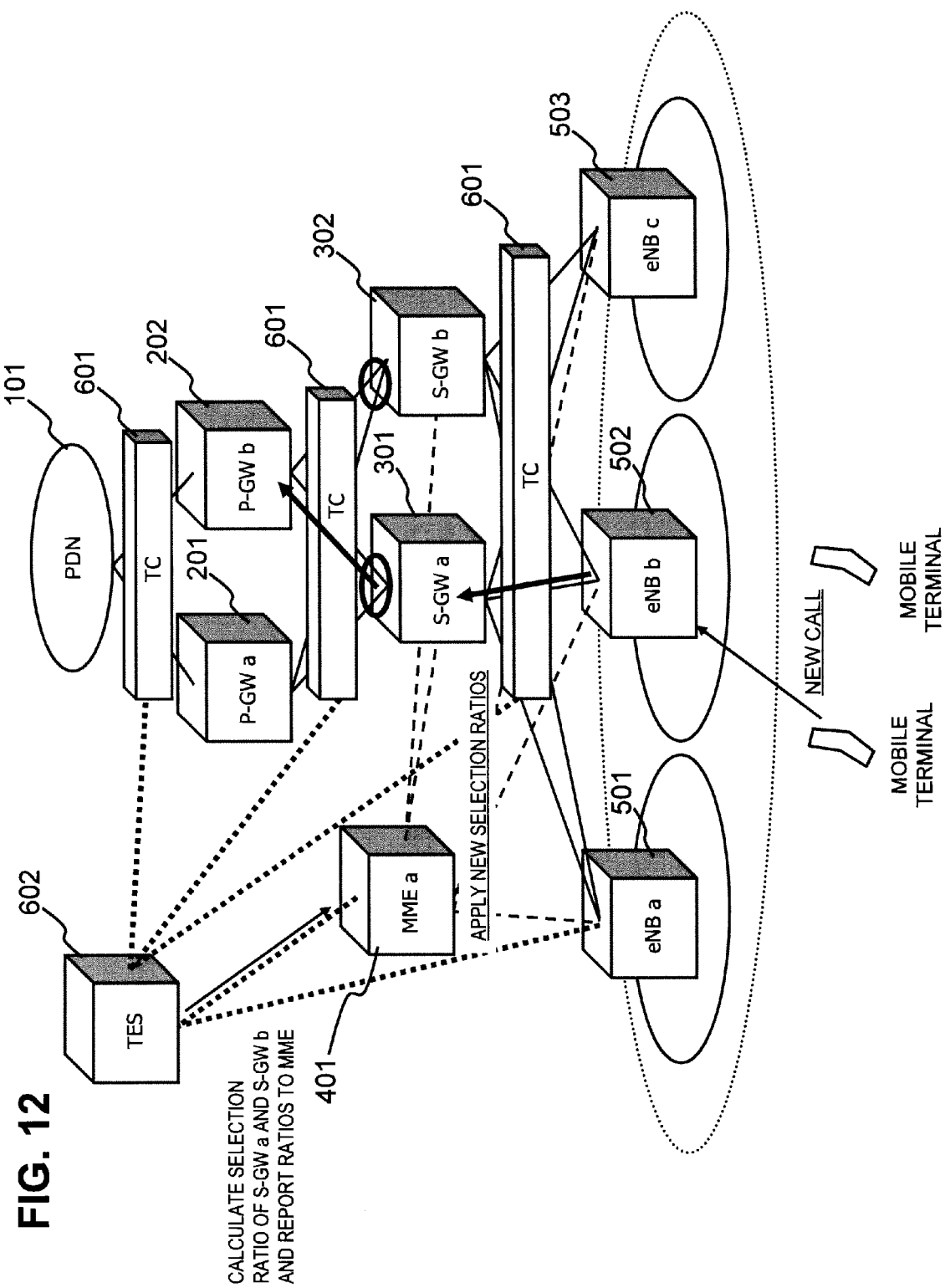
FIG. 12 is a second diagram showing the operation of the selection ratio calculation unit of the traffic control apparatus in the first exemplary embodiment of the present invention.

FIG. 11 and FIG. 12 are diagrams showing the operation of the selection ratio calculation unit 802 of the TES 602 described above. FIG. 11 shows the status before the node selection ratio calculation is performed by the selection ratio calculation unit 802.

The example in FIG. 11 shows the status in which the bandwidth usage ratio of the S-GW a 301 for communication with the P-GW is 20% and the bandwidth usage ratio of the S-GW b 302 for communication with the P-GW is 80%. If a new call is connected via the S-GW b 302 in future, there is a possibility that the bandwidth of the S-GW b 302 for communication with the P-GW will become insufficient.

To address this situation, the selection ratio calculation unit 802 of the TES 602 in this exemplary embodiment calculates the selection ratios of the two S-GWs considering the bandwidth usage ratios so that the bandwidths of the two S-GWs for communication with the P-GW are leveled off and, after that, notifies the calculated selection ratios to the MME 401 as shown in FIG. 12. For example, the example in FIG. 12 shows the status in which the selection ratios are calculated based on the bandwidth usage ratios described above so that the S-GW a 301 is preferentially selected and, as a result, the path is set via the S-GW a 301.

Figure 13:
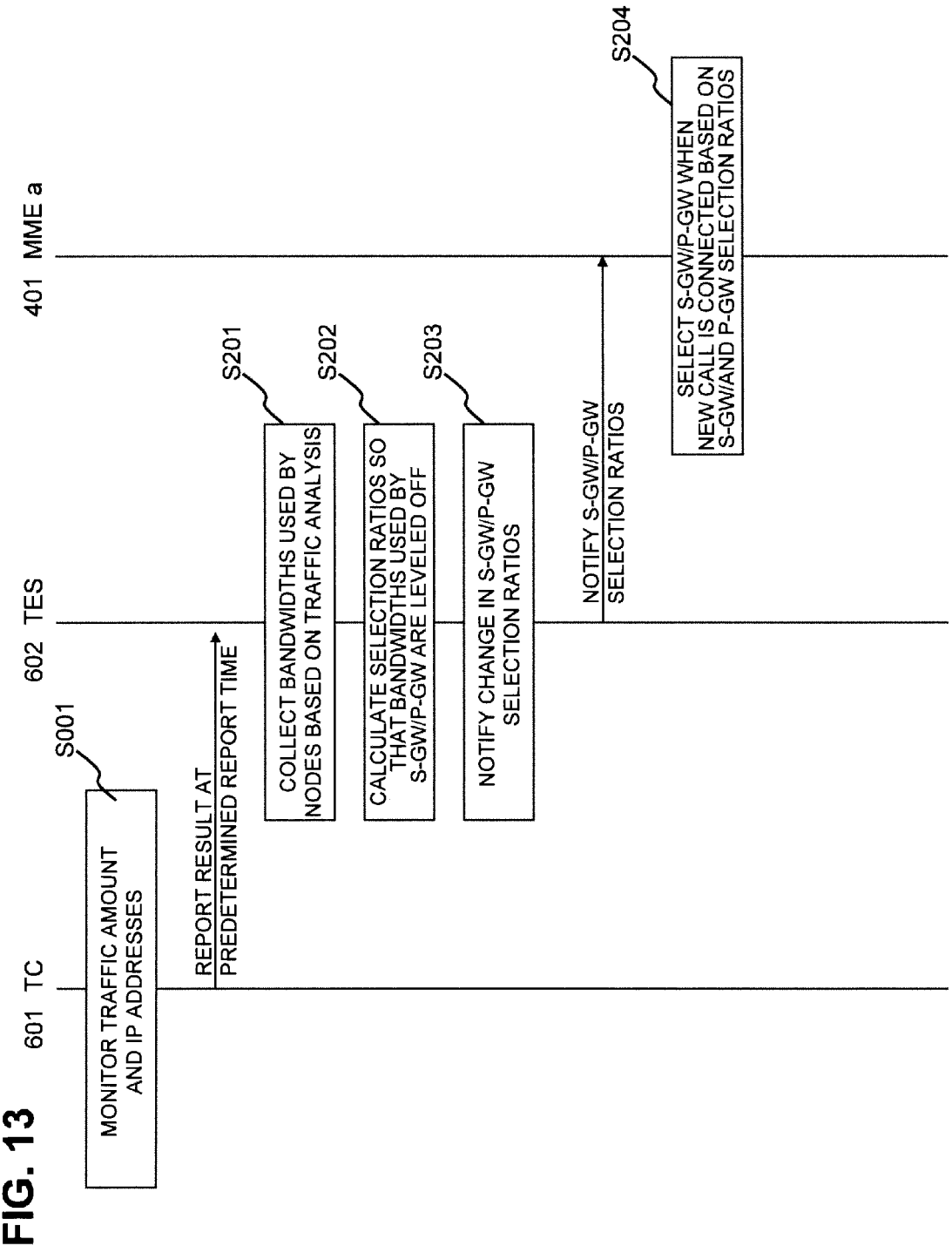
FIG. 13 is a third flowchart showing the operation of the traffic control apparatus in the first exemplary embodiment of the present invention.

FIG. 13 is a diagram showing the processing flow to the time the selection ratios described above are changed. As shown in FIG. 13, each of the TCs 601 installed between the eNBs 501-503 and the S-GWs 301 and 302, between the S-GWs 301 and 302 and the P-GWs 201 and 202, and between the P-GWs 201 and 202 and the PDN 101 monitors (collects) the information such as the data amount of the U-Plane data and the IP addresses (step S001) and reports the monitored result to the TES 602 at a predetermined report time, for example, at regular intervals, at a fixed time, or when the traffic amount changes suddenly. This report may also include the report on the coverage area change processing and the handover start processing described above.

The TES 602 collects the communication bandwidths used by the network nodes based on the traffic information received from the TCs 601 to analyze the congestion status (step S201). If it is determined as the result of the traffic analysis that the node selection ratios need not be changed between any nodes, the subsequent processing is omitted (note that the coverage area change processing described above or the selection ratio calculation processing, which will be described later, is performed if necessary).

Next, based on the result of the analysis described above, the TES 602 calculates the S-GW/P-GW selection ratios for use when the MME 401 selects an S-GW and a P-GW to which a new call is to be connected (step S202).

Next, the TES 602 notifies the calculated S-GW/P-GW selection ratios to the MME 401 (step S203).

When a new call is connected, the MME 401 preferentially selects an S-GW/P-GW whose communication bandwidths are sufficient according to the notified S-GW/P-GW selection ratios to level off the communication bandwidths among S-GWs/P-GWs.

Figure 14:
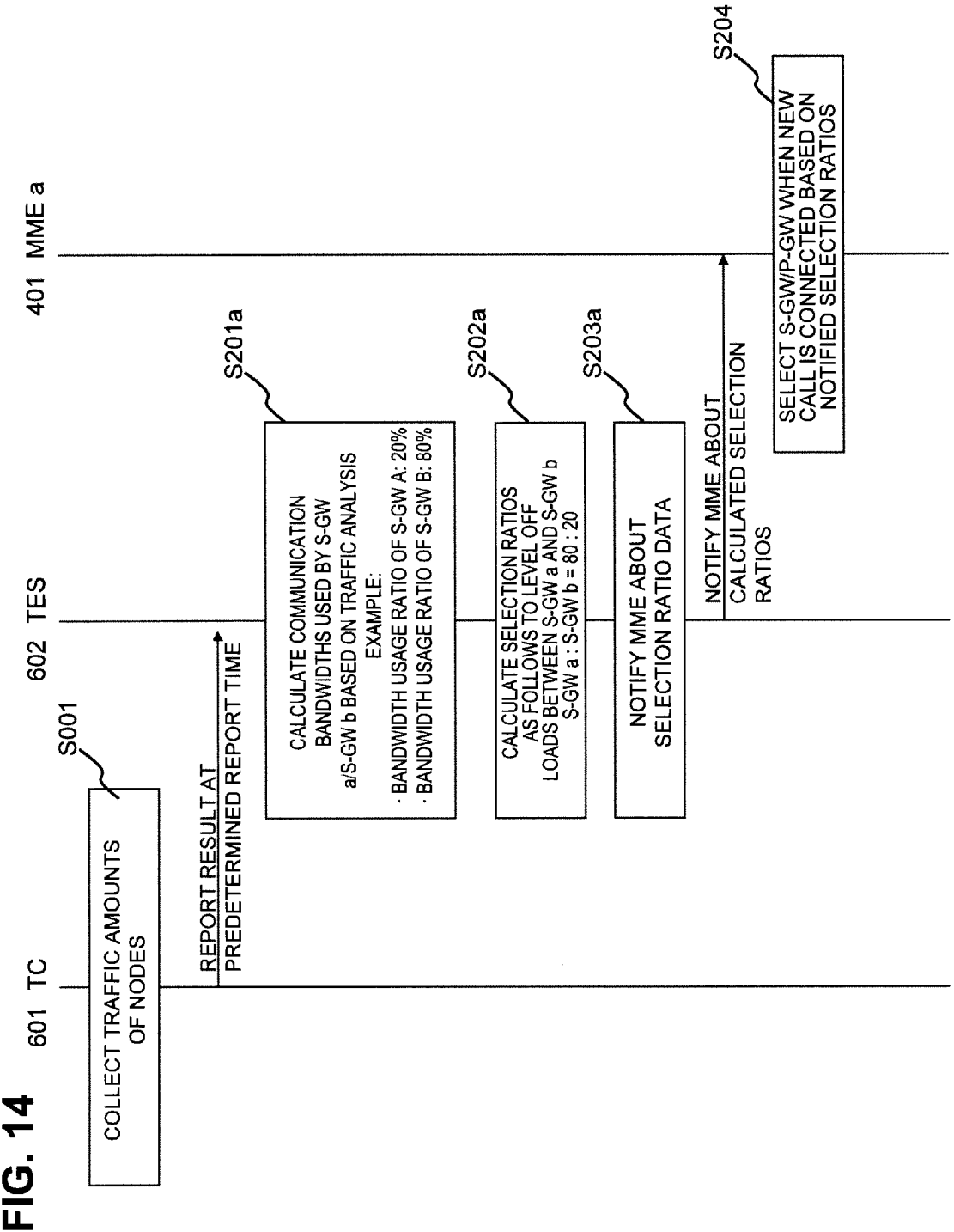
FIG. 14 is a flowchart showing an example of the selection ratio calculation processing.

FIG. 14 is a diagram showing the S-GW selection ratio calculation flow that is executed when the collected result is obtained indicating that the bandwidth usage ratio of the S-GW a 301 for communication with the P-GW is 20% and the bandwidth usage ratio of the S-GW b 302 for communication with the P-GW is 80%. In the example in FIG. 14, the TES 602 calculates the selection ratios in step S202a, where the selection ratio of the S-GW a 301 is 80 and the selection ratio of the S-GW b 302 is 20, so that the bandwidth usage ratios described above become equal.

In this way, the MME 401 can change the node selection ratios, which will be referenced when a new call is connected, to level off the traffic. In addition, the node selection ratios may be changed for any reason as necessary. For example, changing the node selection ratios based on a slight change in the bandwidth usage ratios allows the control processing to be performed flexibly to prevent congestion from being generated.

In addition to the above-described traffic leveling processing performed by the TES 602, cache data is returned by the TC 601 in this exemplary embodiment with the use of the URL analysis unit 703 and the data cache unit 704 of the TC 601. When many accesses are made to a particular URL during a predetermined time, cache data is returned without flowing U-Plane data to the HTTP server corresponding to the URL.

Therefore, when a condition occurs in which traffic concentrates on a particular node in a mobile network, cache data is returned and, at the same time, the coverage area change processing, handover start processing, and node selection ratio change processing described above are performed according to the position where the condition occurs. These processing allows the traffic to be leveled off as quickly as possible without making the user feel that the bandwidth becomes insufficient.

As is apparent from the exemplary embodiment described above, the present invention eliminates the need for mobile communication operators to prepare unnecessary, redundant network nodes and to reduce the CAPEX (capital expenditure)/OPEX (operating expenditure).

While the preferred exemplary embodiment of the present invention has been described, it is to be understood that the present invention is not limited to the exemplary embodiment described above and that further modifications, replacements, and adjustments may be added within the scope not departing from the basic technological concept of the present invention. For example, though the example applied to LTE/EPC is described in the exemplary embodiment above, the present invention may be used independently of the system as long as the network is a mobile network such as a UTRAN/CS•PS domain. The function of the TC may also be included in each network node.

Although the TC 601 in the exemplary embodiment above includes independent functional blocks such as the traffic amount monitoring unit 701, IP address monitoring unit 702, URL analysis unit 703, and data cache unit 704, these functional blocks may be integrated. In addition, one or more functional blocks may be omitted depending upon the functions required by the TC 601. For example, if the data cache function is not necessary, at least the URL analysis unit 703 and the data cache unit 704 may be omitted. If the source IP address/destination IP address of U-Plane data need not be monitored, for example, when the TC 601 is connected to the input port (or output port) of a node to be monitored for monitoring the input traffic (or output traffic), the IP address monitoring unit 702 may be omitted.

Although the exemplary embodiment above describes that the TES 602 includes independent functional blocks such as the traffic analysis unit 801, selection ratio calculation unit 802, handover starting unit 803, and statistical data accumulation unit 804, some of these units may be integrated or omitted. For example, the handover starting unit 803 may be omitted if the handover starting function is not necessary, and the selection ratio calculation unit 802 may be omitted if the selection ratio change function is not necessary. It is also possible to employ the configuration in which a control unit (traffic uneven-distribution determination unit) is provided that determines the traffic uneven-distribution status and transmits an instruction to the functional blocks described above.

Although the exemplary embodiment above describes that the TC 601 reports the traffic status to the TES 602 at a predetermined report time, it is also possible that the TC 601 reports the traffic amount to the TES 602 when the monitored traffic amount exceeds a predetermined threshold. Reporting the traffic amount in this way reduces the network load and simplifies the traffic analysis made by the TES 602.

The exemplary embodiment above describes that the coverage area is increased or decreased. Instead of this, if a base station has a directional antenna such as an adaptive array antenna, it is also possible to employ the configuration to change the coverage area locally by changing the tilt of the antenna or by increasing the transmission power as proposed by SON.

The above exemplary embodiment may also be implemented as a traffic leveling method described below.

[First Supplementary Note]

A traffic leveling method comprising:

monitoring a traffic amount using a traffic monitoring apparatus arranged between different types of nodes in a mobile network, at least one of the nodes having two or more different paths; and collecting, by a traffic control apparatus, a traffic amount from each of the traffic monitoring apparatuses, selecting a control information type and a destination node according to an uneven-distribution status of traffic, and outputting control information instructing that the traffic amount of a node, where traffic is unevenly distributed, be distributed to another node having the same type as the type of the node.

[Second Supplementary Note]

The traffic leveling method as described above wherein, when traffic between an access node and a higher-level access node exceeds a predetermined threshold, the traffic amount of a node, where traffic is unevenly distributed, can be distributed to another node having the same type as the type of the node by the traffic control apparatus that instructs the access node to decrease a coverage area thereof and an access node neighboring to the access node to increase a coverage area thereof.

[Third Supplementary Note]

The traffic leveling method as described above, wherein the traffic amount of a node, where traffic is unevenly distributed, can be distributed to another node having the same type as the type of the node by causing a call accommodated by the node to be handed over to another node that can accommodate the call when the traffic of the node exceeds a predetermined threshold.

[Fourth Supplementary Note]

The traffic leveling method as described above, wherein the traffic amount of a node, where traffic is unevenly distributed, can be distributed to another node having the same type as the type of the node by changing the selection ratio of a higher-level node, selected by the node when a new call is connected, based on the traffic amount between the nodes.

The disclosure of Non Patent Documents given above is hereby incorporated by reference into this specification. The exemplary embodiments and examples may be changed and adjusted in the scope of the entire disclosure (including claims) of the present invention and based on the basic technological concept. In the scope of the claims and the drawings of the present invention, various disclosed elements may be combined and selected in a variety of ways. That is, it is apparent that the present invention includes various modifications and changes that may be made by those skilled in the art according to the entire disclosure, including claims, and technological concepts thereof.

EXPLANATIONS OF SYMBOLS

10 Node
20 Access node
101 Packet data network (PDN)
201,202 PDN•gateway (P-GW)
211 Forwarding node
301,302 Serving gateway (S-GW)
401 Mobility management entity (MME)
501-503 evolved NodeB (eNB)
601 Traffic monitoring apparatus (TC)
602 Traffic control apparatus (TES)
701 Traffic amount monitoring unit
702 IP address monitoring unit
703 URL analysis unit
704 Data cache unit
705 TC-to-TES communication unit
801 Traffic analysis unit
802 Selection ratio calculation unit
803 Handover starting unit
804 Statistical data accumulation unit
805 TC-to-node communication unit

The invention claimed is:

1. A mobile communication system, comprising:
a traffic monitoring apparatus arranged between predetermined nodes in a mobile network for monitoring a traffic amount between the predetermined nodes; and
a traffic control apparatus that outputs control information to the predetermined nodes based on a report from said traffic monitoring apparatus, the control information instructing the predetermined nodes to level the traffic amount, wherein said traffic monitoring apparatus monitors the traffic amount of two or more paths between different types of nodes in the mobile network, said two or more paths being formed including at least one node having two or more different paths, wherein said traffic control apparatus selects a control information type and a destination node according to an uneven-distribution status of traffic and outputs control information instructing that the traffic amount of a node where traffic is unevenly distributed be distributed to another node having a same type as the node where traffic is unevenly distributed, and wherein said traffic monitoring apparatus comprises:
an IP address monitoring unit that monitors a transmission source IP address and a transmission destination IP address of monitored data;
a URL analysis unit that acquires a URL (Uniform Resource Locator) corresponding to the IP address; and
a data cache unit that caches data for each of the acquired URLs and, when access is concentrated on a particular URL during a predetermined period, returns the cached data to a requesting source.

2. The mobile communication system as defined by claim 1, wherein one of control information types and destinations selected by said traffic control apparatus according to an uneven-distribution status of traffic is information that, when traffic between an access node and a higher-level access node exceeds a predetermined threshold, instructs the access node to decrease a coverage area thereof and an access node neighboring to the access node to increase a coverage area thereof.

3. The mobile communication system as defined by claim 1, wherein one of control information types and destinations selected by said traffic control apparatus according to an uneven-distribution status of traffic is information that, when the traffic of a node exceeds a predetermined threshold, causes a call accommodated by the node to be handed over to another node that can accommodate the call.

4. The mobile communication system as defined by claim 1, wherein one of control information types and destinations selected by said traffic control apparatus according to an uneven-distribution status of traffic is information used to change a selection ratio of a higher-level node, selected by a node when a new call is connected, based on the traffic amount between the nodes.

5. The mobile communication system as defined by claim 1, wherein said traffic control apparatus further comprises:
a traffic analysis unit that, when traffic between an access node and a higher-level access node exceeds a predetermined threshold, instructs the access node to decrease a coverage area thereof and an access node neighboring to the access node to increase a coverage area thereof;
a handover starting unit that, when the traffic of a node exceeds a predetermined threshold, causes a call accommodated by the node to be handed over to another node that can accommodate the call; and
a selection ratio calculation unit that changes a selection ratio of a higher-level node, selected by a node when a new call is connected, based on the traffic amount between the nodes.

6. The mobile communication system as defined by claim 1, wherein said traffic monitoring apparatus is connected to an input/output port of the predetermined node for monitoring the traffic amount.

7. The mobile communication system as defined by claim 1, wherein, when the monitored traffic amount exceeds a predetermined threshold, said traffic monitoring apparatus reports the traffic amount to said traffic control apparatus.

8. A traffic control apparatus connected to a traffic monitoring apparatus, said traffic monitoring apparatus arranged between predetermined nodes in a mobile network for monitoring a traffic amount between the predetermined nodes, wherein said traffic control apparatus outputs control information to the predetermined nodes based on a report from said traffic monitoring apparatus, the control information instructing the predetermined nodes to level the traffic amount, wherein said traffic control apparatus is connected to said traffic monitoring apparatus, said traffic monitoring apparatus being arranged between different types of nodes in the mobile network to monitor the traffic amount of two or more paths formed including at least one node having two or more different paths, wherein said traffic control apparatus selects a control information type and a destination node according to an uneven-distribution status of traffic reported by each of said traffic monitoring apparatuses and outputs control information instructing that the traffic amount of a node where traffic is unevenly distributed be distributed to another node having a same type as the node where traffic is unevenly distributed, and wherein said traffic monitoring apparatus comprises:
an IP address monitoring unit that monitors a transmission source IP address and a transmission destination IP address of monitored data;
a URL analysis unit that acquires a URL (Uniform Resource Locator) corresponding to the IP address; and
a data cache unit that caches data for each of the acquired URLs and, when access is concentrated on a particular URL during a predetermined period, returns the cached data to a requesting source.

9. The traffic control apparatus as defined by claim 8, wherein one of control information types and destinations selected according to an uneven-distribution status of traffic is information that, when traffic between an access node and a higher-level access node exceeds a predetermined threshold, instructs the access node to decrease a coverage area thereof and an access node neighboring to the access node to increase a coverage area thereof.

10. The traffic control apparatus as defined by claim 8, wherein one of control information types and destinations selected according to an uneven-distribution status of traffic is information that, when the traffic of a node exceeds a predetermined threshold, causes a call accommodated by the node to be handed over to another node that can accommodate the call.

11. The traffic control apparatus as defined by claim 8, wherein one of control information types and destinations selected according to an uneven-distribution status of traffic is information used to change a selection ratio of a higher-level node, selected by a node when a new call is connected, based on the traffic amount between the nodes.

12. The traffic control apparatus as defined by claim 8, further comprising:
a traffic analysis unit that, when traffic between an access node and a higher-level access node exceeds a predetermined threshold, instructs the access node to decrease a coverage area thereof and an access node neighboring to the access node to increase a coverage area thereof;

a handover starting unit that, when the traffic of a node exceeds a predetermined threshold, causes a call accommodated by the node to be handed over to another node that can accommodate the call; and a selection ratio calculation unit that changes a selection ratio of a higher-level node, selected by a node when a new call is connected, based on the traffic amount between the nodes.

13. A traffic leveling method comprising:

monitoring a traffic amount between nodes using a traffic monitoring apparatus arranged between predetermined nodes in a mobile network; and outputting, by a traffic control apparatus, control information to the predetermined nodes based on a report received from said traffic monitoring apparatus, the control information instructing the predetermined nodes to level the traffic amount, wherein said traffic monitoring apparatus monitors the traffic amount of two or more paths between different types of nodes in the mobile network, said two or more paths being formed including at least one node having two or more different paths, wherein said traffic control apparatus selects a control information type and a destination node according to an uneven-distribution status of traffic and outputs control information instructing that the traffic amount of a node where traffic is unevenly distributed be distributed to another node having a same type as the node where traffic is unevenly distributed, and wherein said traffic monitoring apparatus comprises:

an IP address monitoring unit that monitors a transmission source IP address and a transmission destination IP address of monitored data;

a URL analysis unit that acquires a URL (Uniform Resource Locator) corresponding to the IP address; and a data cache unit that caches data for each of the acquired URLs and, when access is concentrated on a particular URL during a predetermined period, returns the cached data to a requesting source.

14. The traffic control apparatus as defined by claim 8, wherein one of control information types and destinations selected according to the uneven-distribution status of traffic is information that, when traffic between an access node and a higher-level access node exceeds a predetermined threshold, instructs the access node to decrease a coverage area thereof and an access node neighboring to the access node to increase a coverage area thereof.

15. The traffic control apparatus as defined by claim 8, wherein one of control information types and destinations selected according to the uneven-distribution status of traffic is information that, when the traffic of a node exceeds a predetermined threshold, causes a call accommodated by the node to be handed over to another node that can accommodate the call.

16. The traffic control apparatus as defined by claim 9, wherein one of control information types and destinations selected according to the uneven-distribution status of traffic is information that, when the traffic of a node exceeds a predetermined threshold, causes a call accommodated by the node to be handed over to another node that can accommodate the call.

17. The traffic control apparatus as defined by claim 8, wherein one of control information types and destinations selected according to the uneven-distribution status of traffic is information used to change a selection ratio of a higher-level node, selected by a node when a new call is connected, based on the traffic amount between the nodes.

* * * * *